(12) United States Patent
Becattini, Jr. et al.

(10) Patent No.: US 12,490,719 B2
(45) Date of Patent: Dec. 9, 2025

(54) PET TOY

(71) Applicant: Towerstar Pets, LLC, Malvern, PA (US)

(72) Inventors: Fernando Becattini, Jr., Malvern, PA (US); Jacquelyn N. Becattini, Malvern, PA (US); Fernando Becattini, Sr., Devon, PA (US); Steve A. Copeland, Barrie (CA); Nicholas Teixeira, Angus (CA)

(73) Assignee: TOWERSTAR PETS, LLC, Malvern, PA (US)

( * ) Notice: Subject to any disclaimer, the term of this patent is extended or adjusted under 35 U.S.C. 154(b) by 0 days.

(21) Appl. No.: 18/611,038

(22) Filed: Mar. 20, 2024

(65) Prior Publication Data

US 2025/0295094 A1    Sep. 25, 2025

(51) Int. Cl.
   *A01K 15/02*       (2006.01)
   *A01K 5/01*        (2006.01)

(52) U.S. Cl.
   CPC .......... *A01K 15/026* (2013.01); *A01K 5/0114* (2013.01)

(58) Field of Classification Search
   CPC .. A01K 5/0114; A01K 15/024; A01K 15/025; A01K 15/026
   See application file for complete search history.

(56) References Cited

U.S. PATENT DOCUMENTS

| | | |
|---|---|---|
| D188,179 S * | 6/1960 | Tay ................................ 428/188 |
| 5,832,877 A | 11/1998 | Markham |
| 5,947,061 A | 9/1999 | Markham et al. |
| 6,158,391 A * | 12/2000 | Simonetti ............ A01K 15/025 119/702 |
| 6,546,896 B1 | 4/2003 | Markham |
| 6,899,059 B1 | 5/2005 | Crane et al. |
| D537,575 S | 2/2007 | Jager |
| 7,234,420 B1 * | 6/2007 | Tsengas ............... A01K 15/026 119/710 |
| 7,506,614 B1 | 3/2009 | Tsengas |
| 7,631,613 B2 * | 12/2009 | Lescroart ............. A01K 5/0114 119/51.01 |
| D665,136 S | 8/2012 | Day |
| 8,978,590 B2 * | 3/2015 | Nunn .................... A01K 15/025 119/707 |
| 9,661,825 B2 | 5/2017 | Becattini, Jr. et al. |
| 9,788,526 B2 | 10/2017 | Mann |
| D840,121 S | 2/2019 | Becattini, Jr. et al. |
| D843,680 S | 3/2019 | Becattini, Jr. et al. |
| D849,338 S | 5/2019 | Becattini, Jr. et al. |

(Continued)

FOREIGN PATENT DOCUMENTS

WO    2018096524 A1    5/2018

*Primary Examiner* — Ebony E Evans
(74) *Attorney, Agent, or Firm* — Sand, Sebolt & Wernow Co., LPA

(57) ABSTRACT

A pet toy has a unique configuration that is able to dispense a pet treat from the body thereof. The body has holes that extend radially through the body and are in communication with a center cavity. When a pet treat is disposed within the cavity, a syringe-style plunger can be used to expel the pet treat through the holes out of the cavity. Further, the pet toy can also have two enlarged end members that have different diameters that cause the pet toy to move in a curved trajectory as the pet toy rotates about its longitudinal axis.

17 Claims, 30 Drawing Sheets

(56) References Cited

U.S. PATENT DOCUMENTS

| | | |
|---|---|---|
| D858,911 S | 9/2019 | Becattini, Jr. et al. |
| D895,216 S | 9/2020 | Becattini, Jr. et al. |
| D895,906 S | 9/2020 | Becattini, Jr. et al. |
| D904,695 S | 12/2020 | Becattini, Jr. et al. |
| D907,308 S | 1/2021 | Becattini, Jr. et al. |
| 10,888,069 B2 * | 1/2021 | Becattini, Jr. ........ A01K 5/0114 |
| D915,686 S | 4/2021 | Becattini, Jr. et al. |
| D918,486 S | 5/2021 | Becattini, Jr. et al. |
| D918,487 S | 5/2021 | Becattini, Jr. et al. |
| D919,194 S | 5/2021 | Becattini, Jr. et al. |
| D939,737 S | 12/2021 | Pagel |
| 11,330,795 B2 | 5/2022 | Becattini, Jr. et al. |
| 11,477,965 B2 * | 10/2022 | Kendall .................. F16B 21/12 |
| D974,677 S | 1/2023 | Becattini, Jr. et al. |
| D975,376 S | 1/2023 | Becattini, Jr. et al. |
| D981,052 S | 3/2023 | Becattini, Jr. et al. |
| D981,053 S | 3/2023 | Becattini, Jr. et al. |
| 2009/0182308 A1 | 7/2009 | Hagbi |
| 2016/0338309 A1 | 11/2016 | Becattini, Jr. et al. |
| 2019/0133082 A1 | 5/2019 | Becattini, Jr. et al. |
| 2019/0281788 A1 | 9/2019 | Becattini, Jr. et al. |
| 2022/0256808 A1 * | 8/2022 | Axelrod ............... A01K 15/026 |
| 2023/0000053 A1 | 1/2023 | Becattini, Jr. et al. |
| 2023/0000054 A1 | 1/2023 | Becattini, Jr. et al. |
| 2023/0000240 A1 | 1/2023 | Becattini, Jr. et al. |
| 2023/0001455 A1 | 1/2023 | Becattini, Jr. et al. |
| 2023/0008462 A1 | 1/2023 | Becattini, Jr. et al. |
| 2023/0131244 A1 | 4/2023 | Becattini, Jr. et al. |
| 2023/0148566 A1 | 5/2023 | Ubel et al. |
| 2023/0302499 A1 | 9/2023 | Becattini, Jr. et al. |
| 2023/0414056 A1 | 12/2023 | Becattini, Jr. et al. |

* cited by examiner

PET TOY

TECHNICAL FIELD

This disclosure is directed to a pet toy.

BACKGROUND ART

Pet toys offer advantages for pet health. For example, pet toys may aid in dental health, physical exercise, and mental stimulation of a pet. Pet toys are available in many different shapes, sizes and variety of materials. With respect to dogs, some exemplary pet toys are chew toys that have a general dumbbell or barbell shape. The shape of dumbbell or barbell dog toys serves as an effective dental aid. As dogs chew and play with these toys, the barbell's design massages their gums and helps clean their teeth. The textured surface promotes oral hygiene, reducing plaque buildup and supporting overall dental health.

The shape of the toy allows dogs to grip and manipulate the toy, promoting active movement and muscle engagement. This is beneficial as encouraging dogs to engage in play with toys contributes to their physical well-being. Regular exercise is essential for maintaining a healthy weight, muscle tone, and cardiovascular fitness.

Additionally, dogs benefit from mental stimulation as much as physical exercise. Toys engage dog's minds, preventing boredom and providing an outlet for natural instincts. Dogs can explore different angles and textures, keeping their brains active and entertained.

Some pet toys incorporate the delivery of a treat to a dog. This further enhances the dog's desire to interact with the toy. However, when delivering the treat to the pet toy, the treat is dispensed irrespective of the location at which the dog is playing with the toy. This can result in a mess. For example, if the treat is peanut butter and the pet toy delivers peanut butter to the dog, the peanut butter can inadvertently make a mess in carpet upon which the dog is playing.

SUMMARY OF THE INVENTION

Although many pet toys are currently available, there is still room for improvement. Delivering a treat to the dog can be somewhat difficult when the treat is stored in the internal volume or compartment of the toy and the pet owner wants to ensure that the pet toy remains on a surface that is easy to clean (e.g., tile floors instead of carpet). Thus, a need exists for an improved configuration for delivering a treat to a pet, such as a dog, via a pet toy that does inhibits rolling onto an undesired surface. The present disclosure addresses this issue among other needs for improving a pet toy that can deliver a treat but also encourage the pet toy to remain in a preferred location.

In one aspect, an exemplary embodiment of the present disclosure may provide a pet toy comprising: a body extending between a first end and a second end along a center longitudinal axis; a first enlarged member that defines the first end of the body; a second enlarged member that defines the second end of the body; an elongated central portion of the body that extends between the first enlarged member and the second enlarged member, wherein the elongated central portion defines a cavity therein; an opening defined in the body, wherein the opening is in open communication with the cavity, and the opening permits a treat stored in the cavity to exit the body; a first dimension of the first enlarged member, wherein the first dimension extends through the center longitudinal axis and is measured between two different points on a perimeter of the first enlarged member; a second dimension of the second enlarged member, wherein the second dimension extends through the center longitudinal axis and is measured between two different points on a perimeter of the second enlarged member; wherein the first dimension is greater than the second dimension that is adapted to cause the pet toy to roll along a curved trajectory as the pet toy rotates about the center longitudinal axis. This exemplary embodiment or another exemplary embodiment may further provide that the first dimension is the diameter of the first enlarged member and the second dimension is the diameter of the second enlarged member, wherein the diameter of the first enlarged member is greater than the diameter of the second enlarged member. This exemplary embodiment or another exemplary embodiment may further include a ratio of the first dimension to the second dimension, wherein the ratio is at least 1.05:1. This exemplary embodiment or another exemplary embodiment may further include a ratio of the first dimension to the second dimension, wherein the ratio is in a range from about 1.05:1 to about 4:1. This exemplary embodiment or another exemplary embodiment may further include a ratio of the first dimension to the second dimension, wherein the ratio is about 4:3.

This exemplary embodiment or another exemplary embodiment may further provide that the elongated central portion of the body is shaped as a conical cylinder that has a wider first end coupled to the first enlarged member and a narrower second end coupled to the second enlarged member.

This exemplary embodiment or another exemplary embodiment may further include a plurality of ridge flights that extend outward from the elongated central portion that spirally wind around the longitudinal axis; wherein the opening extends radially relative to the longitudinal axis through the elongated central portion of the body at a location that is between two ridge flights.

This exemplary embodiment or another exemplary embodiment may further provide that the opening is a hole extends radially relative to the longitudinal axis through the elongated central portion of the body, that further comprises: a ratio of an inner diameter of cavity to a diameter of the hole that is in a range from about 3:1 to about 7:1. This exemplary embodiment or another exemplary embodiment may further provide that the ratio is about 5:1.

This exemplary embodiment or another exemplary embodiment may further provide that the pet treat is a non-Newtonian fluid. This exemplary embodiment or another exemplary embodiment may further provide that the pet treat is peanut butter or another paste or paste-like treat material.

This exemplary embodiment or another exemplary embodiment may further include an inner surface of the elongated central portion, wherein the inner surface defines a majority of the cavity, wherein the inner surface is partially defined by a tapered wall. This exemplary embodiment or another exemplary embodiment may further provide that the tapered wall terminates at an edge defining a circular end opening of the body, wherein the circular end opening has a diameter that is less than a diameter of the cavity. This exemplary embodiment or another exemplary embodiment may further provide that the tapered wall is in the second enlarged member and the circular end opening extends axially through the second enlarged member and is in open communication with the cavity. This exemplary embodiment or another exemplary embodiment may further provide that the tapered wall tapered wall tapers at an angle that complements an end a plunger that is adapted to be inserted axially through the cavity.

In yet another aspect, another exemplary embodiment of the present disclosure may provide in combination, a pet toy and a plunger, the combination comprising: a pet toy body defining a cavity, and one or more holes in open communication with the cavity, and the holes extend radially from a longitudinal axis through the pet toy body; a distal end of the plunger having a diameter that complements a diameter of the cavity; wherein a pet toy body is adapted to receive a pet treat within the cavity; and wherein the distal end of the plunger moves axially along the longitudinal axis through the cavity to expel the pet treat radially outward from the cavity through the plurality of holes to dispose the pet treat on an exterior surface of the pet toy body. This exemplary embodiment or another exemplary embodiment may further include a first enlarged member that defines the first end of the body; a first dimension of the first enlarged member, wherein the first dimension extends through the longitudinal axis and is measured between two different points on a perimeter of the first enlarged member; a second enlarged member that defines the second end of the body; a second dimension of the second enlarged member, wherein the second dimension extends through the longitudinal axis and is measured between two different points on a perimeter of the second enlarged member; and wherein the first dimension is greater than the second dimension that is adapted to cause the pet toy to roll along a curved trajectory as the pet toy rotates about the longitudinal axis. This exemplary embodiment or another exemplary embodiment may further include an elongated central portion of the body that extends along the longitudinal axis between the first enlarged member and the second enlarged member, wherein the elongated central portion defines the cavity therein; and an end opening defined in the body, wherein the end opening is in open communication with the cavity, and the opening permits a treat to be inserted into the cavity, wherein the end opening receives the distal end of the plunger when the treat is to be expelled from the cavity.

In yet another aspect, another exemplary embodiment of the present disclosure may provide a method of dispensing a pet treat from a pet toy, the method comprising: placing the pet treat into a cavity defined by a central portion of the pet toy, wherein a longitudinal axis extends centrally through the cavity, and wherein the cavity has a diameter, and the central portion defines one or more holes that extend radially relative to the longitudinal axis through the central portion; aligning a plunger axially along the center longitudinal axis; moving a distal end of the plunger axially along the center longitudinal axis through an end opening defined by the pet toy, wherein the distal end of the plunger has a diameter that complements the diameter of the cavity; expelling the pet treat radially relative to the longitudinal axis through the one or more holes defined in the central portion; and disposing the pet treat on an exterior surface of the central portion. This exemplary embodiment or another exemplary embodiment may further include rotating the pet toy about the longitudinal axis; moving the pet toy along a curved trajectory as the pet toy rotates about the longitudinal axis, wherein moving along the curved trajectory is accomplished by the pet toy having two enlarged members having differing diameters, wherein the first enlarged member is located at one end of the central portion and the second enlarged member is located at the other end of the central portion.

BRIEF DESCRIPTION OF THE DRAWINGS

One or more exemplary embodiment(s) of the present disclosure is set forth in the following description, is shown in the drawings and is particularly and distinctly pointed out and set forth in the appended claims. The accompanying drawings, which are incorporated in and constitute a part of the specification, illustrate various example configurations and methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 28:
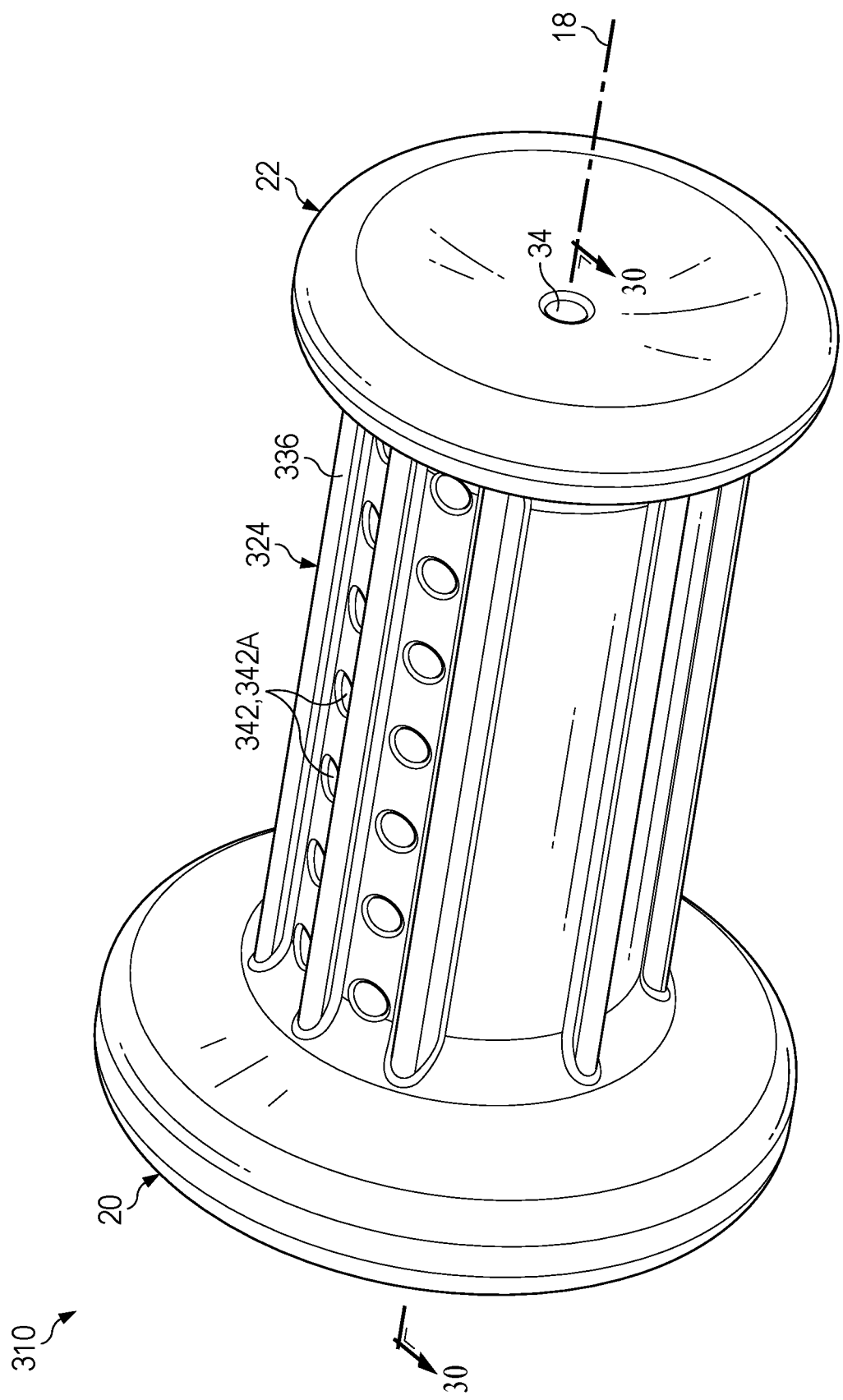
FIG. 28 is a front perspective view of a fourth embodiment of a pet toy.
Figure 29:
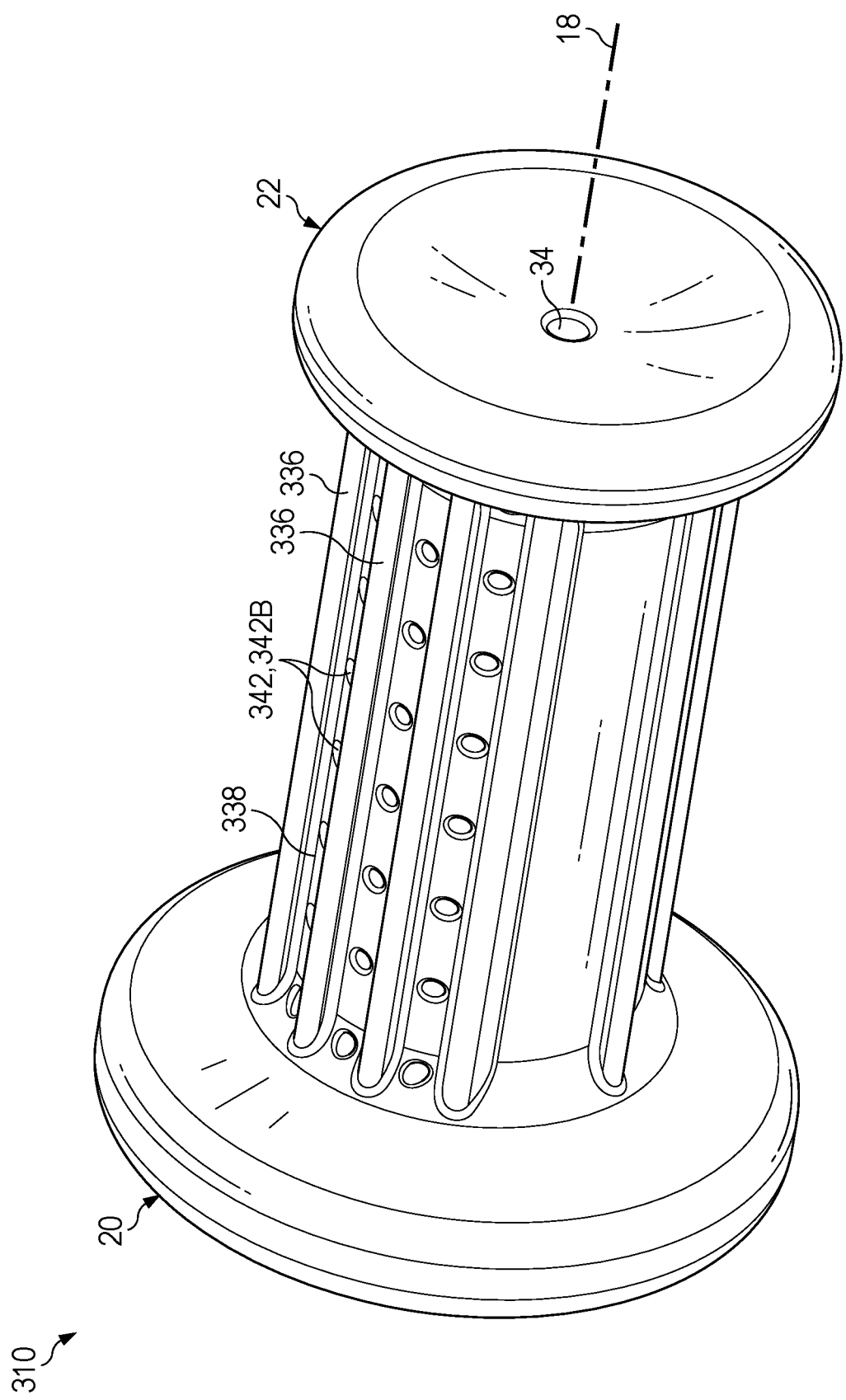
FIG. 29 is a rear perspective view of the fourth embodiment of a pet toy.
Figure 30:
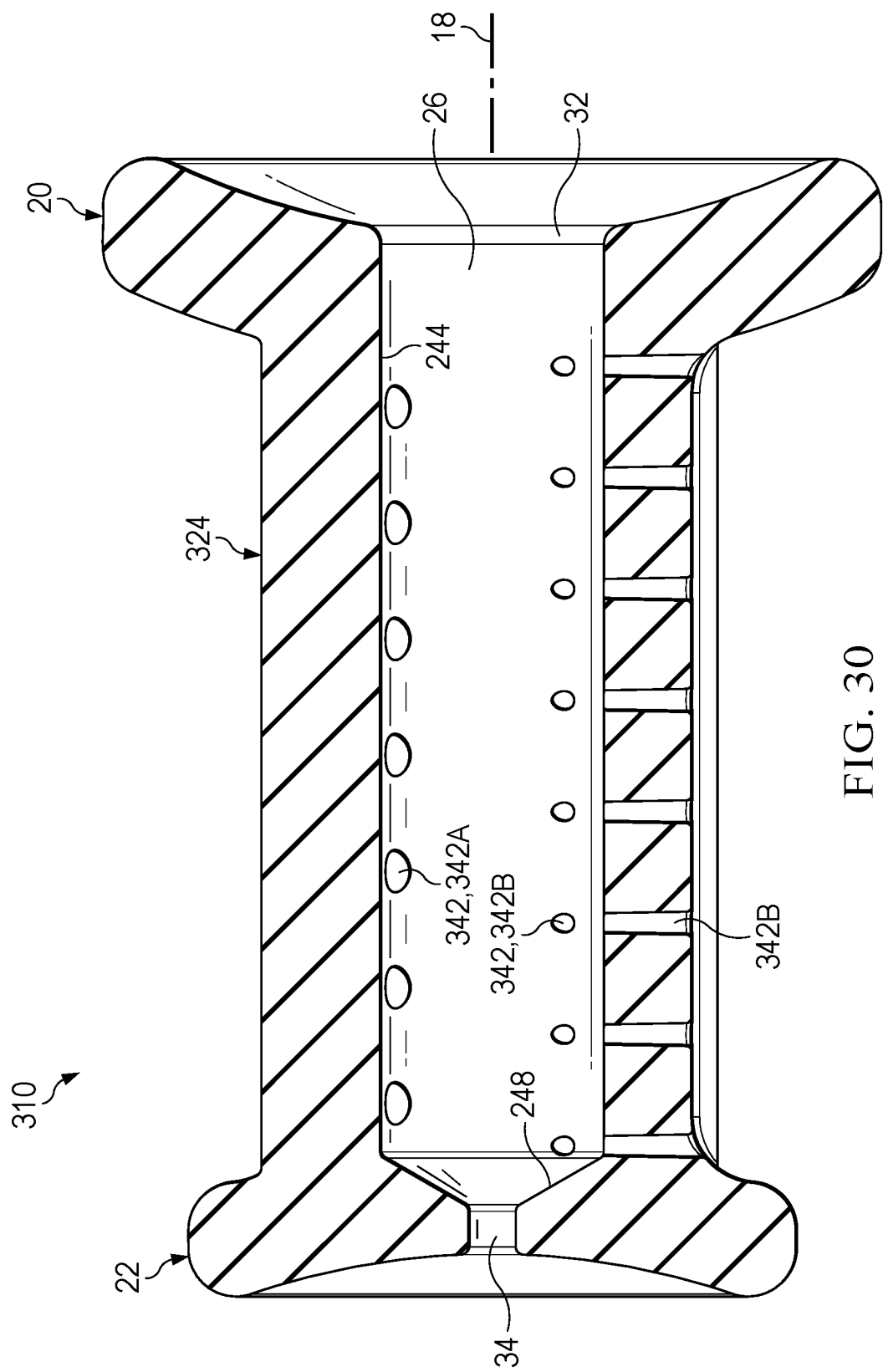
FIG. 30 is a longitudinal cross section view of the fourth embodiment of the pet toy taken along line 30-30 in FIG. 28.

The Figures depict various embodiments of a pet toy. FIGS. 1-9 depict a first embodiment of the pet toy at 10. FIGS. 9-18 depict a second embodiment of the pet toy at 110. FIGS. 19-27 depict a third embodiment of the pet toy at 210. FIGS. 28-30 depict the fourth embodiment of the pet toy at 310. Any of these embodiments may be used in combination with a plunger 250 so as to define a pet toy system or combination that can be used to eject or expel a pet treat from the pet toy.

Due to the similarities between the various embodiments, reference numerals that are repeated throughout the figures refer to similar parts. Those reference numerals may be described with respect to another embodiment, but for brevity may not be repeated in the description of that embodiment. However, it is to be understood that components from one embodiment may be present or claimed in another embodiment.

FIGS. 1-9 depict that pet toy 10 includes a body 12. The body 12 may be generally shaped as a dumbbell or barbell having enlarged ends and an elongated center portion extending between the enlarged ends. Although this particular embodiment is generally dumbbell-shaped or barbell-shaped, other shapes are entirely possible as described herein.

The body 12 of the pet toy 10 may be a unibody that is integrally extruded, molded, printed, or additively manufactured, removably machined, or formed as a unitary, monolithic member substantially fabricated from a flexible, semi-flexible or semi-rigid, manmade or natural, material. The body 12 of the pet toy 10 may be formed from an elastomeric material or rubber material configured to withstand deformation upon chewing or bending by the pet (i.e., a dog). In one example, polymers, such as silicone, plastic (polypropylene or PVC), rubber, or nylon may form a substantial majority of the components or elements used to fabricate the body of the pet toy and the various components integrally formed, molded, or extruded therewith. Silicone is a polymerized siloxane compound, consisting of chains made of alternating silicon (Si) and oxygen (O) atoms. While most industrial polymers contain carbon in their backbones, silicones are unique "inorganic" polymers. Silicones are known for their chemical inertness, resistance to water and oxidation, stability at extreme temperatures, flexibility, and heat resistance. Plastics are polymeric materials with diverse properties. They can be molded or shaped due to their plasticity, which combines low density, low electrical conductivity, transparency, and toughness. Some exemplary commodity resins include high-volume, low-cost plastics such as polyethylene, polypropylene, polyvinyl chloride (PVC), and polystyrene. Natural rubber, also known as latex, consists of polymers of the organic compound isoprene ($C_5H_8$). It contains minor impurities of other organic compounds. Natural rubber is stretchable, resilient, and waterproof. The pet toy body should withstand typical bite forces or chewing forces imparted from a dog that interacts with the pet toy with the dog's mouth.

In one particular embodiment, the body 12 of the pet toy 10, when crafted from nylon, exhibits specific properties that make it suitable for pet interaction. Nylon is a synthetic polymer known for its strength, durability, and flexibility. It belongs to the family of polyamides and is commonly used in various applications due to its favorable properties. Nylon consists of repeating units linked by amide bonds. It contains carbon (C), hydrogen (H), oxygen (O), and nitrogen (N) atoms in its backbone. Unlike natural rubber, nylon is an inorganic polymer, meaning it lacks carbon-carbon (C—C) bonds in its backbone. Instead, it contains amide (C—N) linkages. Nylon is robust and can withstand mechanical stress, including biting forces from pets. Yet, it remains flexible even under strain, making it suitable for pet toys. Nylon can be modified to have a textured surface for better grip during play. Nylon can be dyed in various colors to enhance visual appeal.

While it is contemplated that the body 12 of the pet toy 10 and its additional components described herein are uniformly and integrally extruded, molded, or formed, it is entirely possible that the components of the pet toy body be formed separately from alternative materials as one having routine skill in the art would understand. Furthermore, while the components of the body 12 of the pet toy 10 are discussed below individually, it is to be clearly understood that the components and their corresponding reference elements of the pet toy body are portions, regions, or surfaces of the body 12 and all form a respective element or component of the unitary pet toy body. Thus, while the components may be discussed individually and identified relative to other elements or components of the body 12 of the pet toy 10, in this exemplary embodiment, there is a single pet toy body 12 having the below described portions, regions, or surfaces.

The body 12 of the pet toy 10 extends between a first end 14 and a second end 16 along a center longitudinal axis 18. A first enlarged member 20 defines the first end 14 of the body 12. A second enlarged 22 member defines the second end 16 of the body 12. The elongated central portion 24 of the body 12 extends between the first enlarged member 20 and the second enlarged member 22. The elongated central portion 24 defines a cavity 26 therein. There is at least one opening or hole defined in the body. The at least one opening is in open communication with the cavity, and the opening permits a treat stored in the cavity to exit the body 12. In one embodiment, the opening is formed in one of the enlarged members 20 or 22. In another embodiment, one opening is formed in each of the enlarged members 20 and 22. In other embodiments, the opening or hole extends radially through the elongated central portion 24 of the body 12.

There is a first dimension 28 of the first enlarged member 20. The first dimension 28 extends through the center longitudinal axis 18 and is measured between two different points on a perimeter of the first enlarged member 20. In one embodiment, the first dimension 28 is a diameter when the first enlarged member 20 has a circular profile. However, the dimension 28 may not be a "diameter" should the first enlarged member 20 have a profile shape that is different from a circular profile.

There is a second dimension 30 of the second enlarged member 22. The second dimension 30 extends through the center longitudinal axis 18 and is measured between two different points on a perimeter of the second enlarged member 22. In one embodiment, the second dimension 30 is a diameter when the second enlarged member 22 has a circular profile. However, the dimension may not be a "diameter" should the second enlarged member 22 have a profile shape that is different from a circular profile.

In one particular embodiment, the first dimension 28 is greater than the second dimension 30. The advantage of having the first dimension 28 being different or greater than the second dimension 30 is that it causes the pet toy 10 to roll in a circle (e.g., along a curved trajectory) when the pet toy rotates about the longitudinal axis 18. This causes the pet toy 10 to remain within a general area bound by the rolling path. This is beneficial for pet owners so that the pet toy 10 does not roll away during use/play into another area of the home that the pet owner does not want the pet to take the toy. For example, the pet toy 10 will roll in a circle on a tile floor and will not inadvertently roll away onto a carpeted area.

More specifically, when the two enlarged members 20 and 22 that have differing diameters are connected by the elongated central portion 24, which acts as an axle, the pet toy 10 will exhibit unique rolling behavior. Namely, as one of the enlarged member rolls, a point on its perimeter traces out a specific path. This path is called a cycloid. Due to the different diameters, the two enlarged members exhibit different cycloid curves. The different cycloid curves cause the pet toy to roll along a curved trajectory in a circular motion (when viewed from above). Particularly, when the pet toy 10 rolls, the larger enlarged member (i.e., the first enlarged member 20) travels a longer distance (circumference) in one revolution compared to the smaller enlarged member (i.e., the second enlarged member 22). Since the first and second enlarged members 20 and 22 are connected by the elongated central portion 24, they all rotate together. However, due to their differing diameters or circumferences, the enlarged members 20 and 22 experience different angular displacements during each rotation. The larger enlarged member (i.e., the first enlarged member 20) covers a larger angle (i.e., more radians) than the smaller enlarged member (i.e., the second enlarged member 22). This difference in relative motion causes the pet toy 10 to veer off its straight path when rolling and rotating about the axis 18. The combined effect of the differing angular displacements results in a curved trajectory 40 for the pet toy 10 as it rolls. The pet toy 10 tends to turn toward the side with the smaller enlarged member (i.e., the second enlarged member 22).

The different sizes of the first enlarged member 20 and the second enlarged member may establish a ratio of the first dimension 28 to the second dimension 30. In one embodiment, the ratio of the first dimension 28 to the second dimension 30 is at least 1.05:1. In another embodiment, the ratio of the first dimension to the second dimension, is in a range from about 1.05:1 to about 4:1. These dimensions and ratios are not mere matters of design choice. Rather, it has been determined that the embodiments that utilize this ratio can optimize the rolling of the pet toy 10 along a curved path or trajectory 40 that permits a sufficient amount of rolling to stimulate the dog but still sufficiently maintain or keep the pet toy 10 in a desired area during usage by the pet. In one specific embodiment, the ratio of the first dimension 28 to the second dimension 30 is 41:32. When the ratio is 41:32, the first dimension 28 is 82 units (i.e., millimeters) and the second dimension is 64 units (i.e., millimeters). These units show that one particular embodiment has a ratio of the first dimension 28 to the second dimension 30 that is about 4:3 (i.e., 1.33:1).

Although the curved trajectory 40 is imparted based on the different dimensions 28 and 30, it is also possible to introduce an oscillatory movement into the curved trajectory 40. This would be accomplished by making one of the enlarged members have an oval profile, such that it acts as a cam, when the other enlarged member is circular. In this example, the second enlarged member 22 has an oval (elliptical) profile and a smaller diameter dimension 30. The first enlarged member 28 has a larger circular profile. As the pet toy 10 moves forward, the larger circular enlarged member 20 covers more ground per rotation than the smaller oval member 22. The centripetal acceleration acts toward the center of rotation for both members 20 and 22. However, due to the differing circumferences, the smaller oval member 22 experiences a shorter centripetal acceleration than the larger circular member 20. The combination of these effects results in a curved path for the entire pet toy 10. Additionally, the oval shape of the second enlarged member 22 introduces an oscillation during the curved movement. As the pet toy 10 rolls, the smaller oval shaped member 22 has varying centripetal acceleration that causes it to oscillate slightly, creating a wavy motion superimposed on the curved trajectory 40. The movement of pet toy 10 tends to veer toward the side with the smaller oval member 22, leading to a pet-stimulating interplay of curved trajectory 40 and oscillations. Alternatively, both enlarged members 20 and 22 could have oval profile to impart the oscillations during the rolling of the pet toy 10.

In the shown exemplary embodiment, the first and second enlarged members 20 and 22 are disc-like enlarged regions that have an exterior surface. In one embodiment, the exterior surface of the first and second enlarged member is generally convex in shape and the interior surface is generally concave in shape. Each of the first and second enlarged members 20 and 22 also have outermost edges, and outermost surfaces. The first enlarged member 20 may define an opening 32 that is in open communication with the cavity 26 of the elongated central portion 24. This exemplary opening is free of any lobes or other obstructions and is simply generally circular in shape.

The second enlarged member 22 may also define an opening 34 that is in open communication with the internal cavity 26. An edge defining the opening 34 may have any geometric shape. In one particular example, the edge may include a plurality of connected sections that define a star-shaped opening. Star-shaped opening may be defined by a generally circular peripheral edge that is periodically interrupted by a plurality of lobes that extend inwardly toward longitudinal axis. The star-shaped opening is illustrated as including six lobes. However, it is entirely contemplated that the edge defining the opening 34 may have any shape suitable to fit pet treats therethrough. For example, instead of a star-shaped opening being defined by the star-shaped edge, the opening may simply be circular in shape. Alternatively, the opening 34 may be a simple circular shape, as shown in the other embodiments herein.

The elongated central portion 24 has a narrower diameter than the enlarged members 20 and 22. The elongated central portion 24 extends between the enlarged members. The elongated central portion 24 may comprise a wall that is configured to include a plurality of ridge flights 36 that extend radially outward relative to axis 18 from the outer surface of the elongated central portion 24. The ridge flights 36 spirally wind or helically wind around the longitudinal axis 18. In the shown embodiment, the number of ridge flights 36 on the elongated central portion is between 3 flights and 9 flights. There may be an interstitial space 38 located between two adjacent ridge flights 36.

In one exemplary embodiment, the angular rotation of each of the ridge flights may be approximately 180° around the longitudinal axis 18 along the length of the elongated central portion 24. For example, a first end of one of one ridge flight 36 may begin at one side of the elongated central portion near the first enlarged member 20. That ridge flight 36 may spiral approximately 180° around the longitudinal axis 18 along the length of the elongated central portion 24 such that a second end of that ridge flight 26 terminates at an opposite side of the elongated central portion 22 near the second enlarged member 22. In other embodiments, the ridge flights may spiral more than 180° around the longitudinal axis 18 along the length of the elongated central portion 24. For example, the ridge flights 36 may spiral about 270°, 360°, 450°, 540°, 630°, 720°, 810°, 900°, 990°, 1080° or more around the longitudinal axis 18 along the length of the elongated central portion 24.

In the first embodiment, the elongated central portion 24 is cylindrical. There is an exterior wall of the elongated central portion 24 that is oriented parallel to and concentric with longitudinal axis 18 along its entire length between the first enlarged member 20 and the second enlarged member 22.

FIGS. 10-18 depict the second embodiment of the pet toy 110. As mentioned previously, components in the pet toy 110 that have similar reference elements as the pet toy 10 are the same. It is seen that that pet toy 110 is similar to the pet toy 10 except that the elongated central portion 124 tapers from the first end to the second end.

In the second embodiment of pet toy 110, the elongated central portion 124 is shaped as a conical cylinder. A conical cylinder is a three-dimensional shape known as an inverted frustum. It is formed when the vertex of a cone is cut by a plane parallel to the base of the shape and it is inverted. As such, the conical cylinder has a tapered profile from one end to the other. In the shown embodiment, the profile of the elongated center portion 124 tapers from the first enlarged member 20 to the second enlarged member 22. The enlarged members 20 and 22 still have the differing dimensions to encourage a curved rolling path or curved trajectory 40 as previously described.

The angle at which the elongated central portion 124 tapers from the first end to the second end can vary depending on the application specific needs of the pet toy 110. For example, for a pet toy 110 that is intended to be used with smaller dogs, a greater taper angle may be desirable. Whereas larger dogs may prefer the pet toy 110 to have a smaller taper angle. In one embodiment, the elongated central portion 124 may taper approximately 25% over its longitudinal length. Stated otherwise, if the diameter of the elongated central portion 124 is equal to X near the first enlarged member 20, then the diameter of the elongated central portion 124 may equal approximate 75% of X near the second enlarged member near the second enlarged member 22. Thus, if the elongated central portion 124 has an exterior diameter that is a factor of 4 units near the first enlarged member 20, then the elongated central portion 124 would have an exterior diameter that is a factor of 3 units near the second enlarged member 22.

FIGS. 19-27 depict that pet toy 210 may include one or more apertures or holes 242 that extend entirely through body 12 at the elongated central portion 224. The elongated central portion 224 of pet toy 210 can be either a tapered cylindrical shape (e.g., similar to pet toy 110) or a straight cylinder (e.g., similar to pet toy 10).

The holes 242 extend radially relative to axis 18. The holes 242 may define a plurality of holes that are in open communication with the internal center cavity 26 of the elongated central portion 224. The holes 242 may extend in the spiral or helical pattern in the interstitial space 38 located between adjacent ridge flights 36. In the shown embodiment, the holes 242 are located in each space 38 between adjacent ridge flights 36, however is possible for the holes 242 to be located in only some of the spaces 38 between adjacent ridge flights 36. Further, although the holes 242 follow the spiral pattern or helical pattern, this is not required. Further, the holes 242 may all have uniform diameters or some holes 242 may have different diameters than each other.

Figure 1:
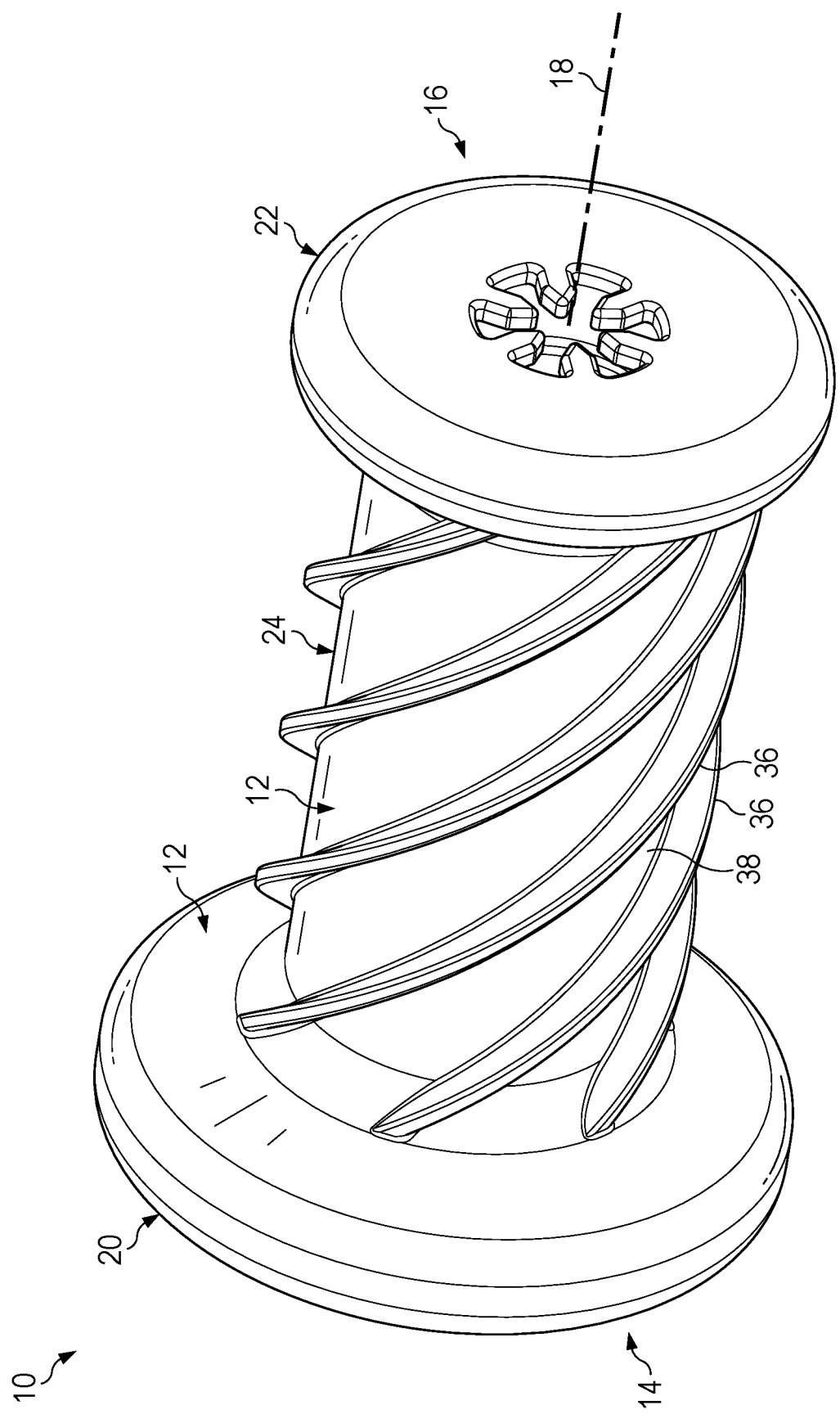
FIG. 1 is a front perspective view of a first embodiment of a pet toy.
Figure 2:
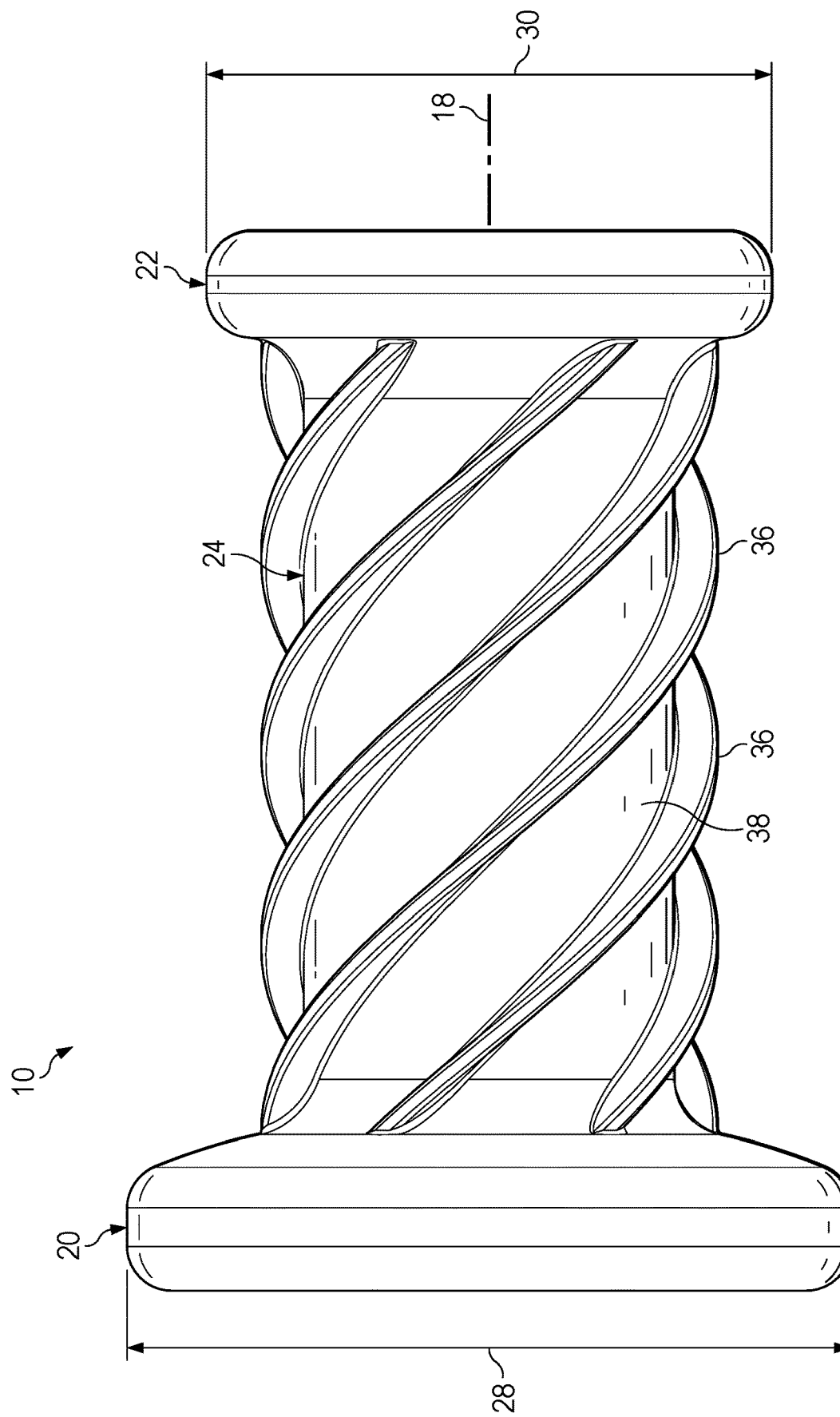
FIG. 2 is a front elevation view of the first embodiment of the pet toy.
Figure 3:
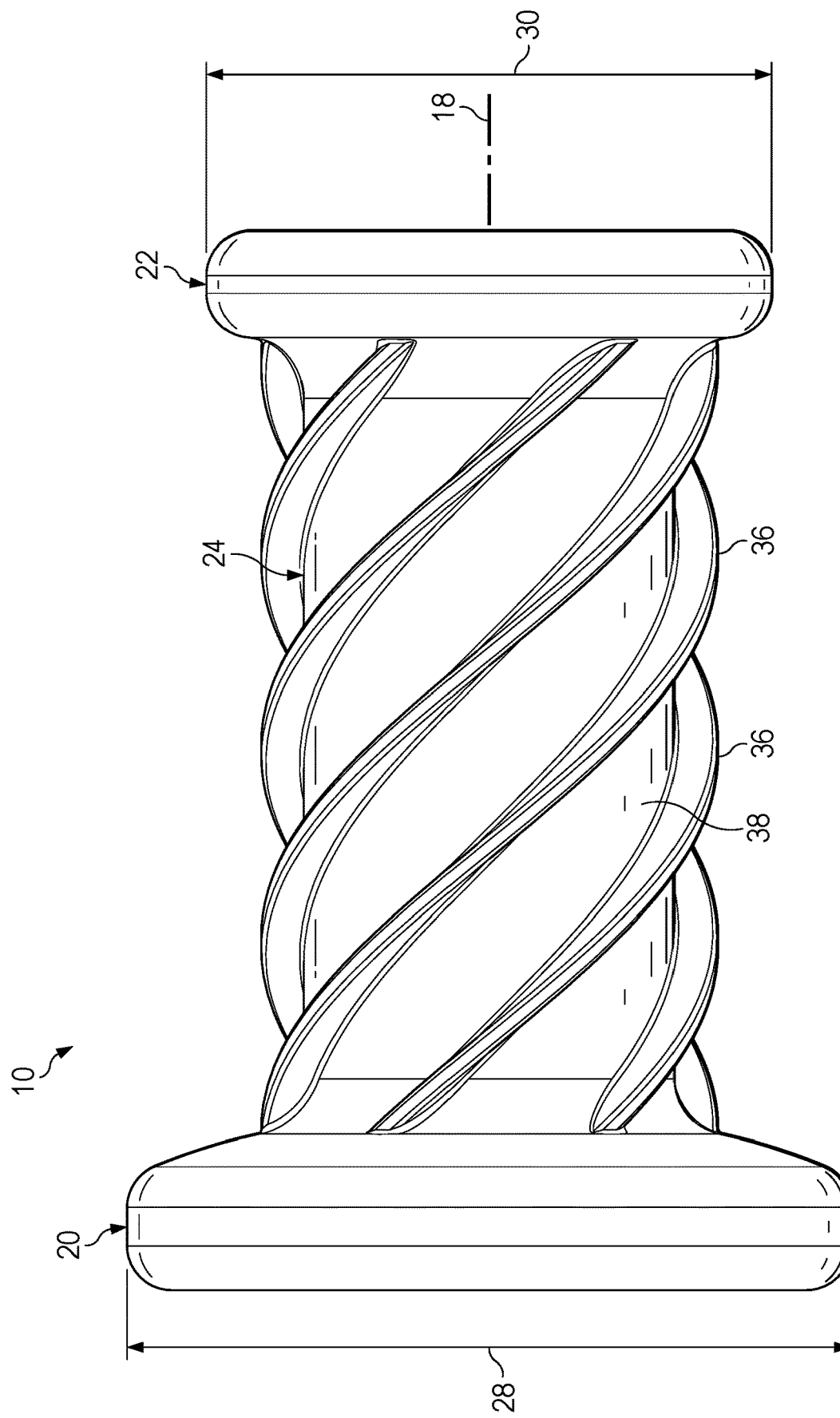
FIG. 3 is a rear elevation view of the first embodiment of the pet toy.
Figure 4:
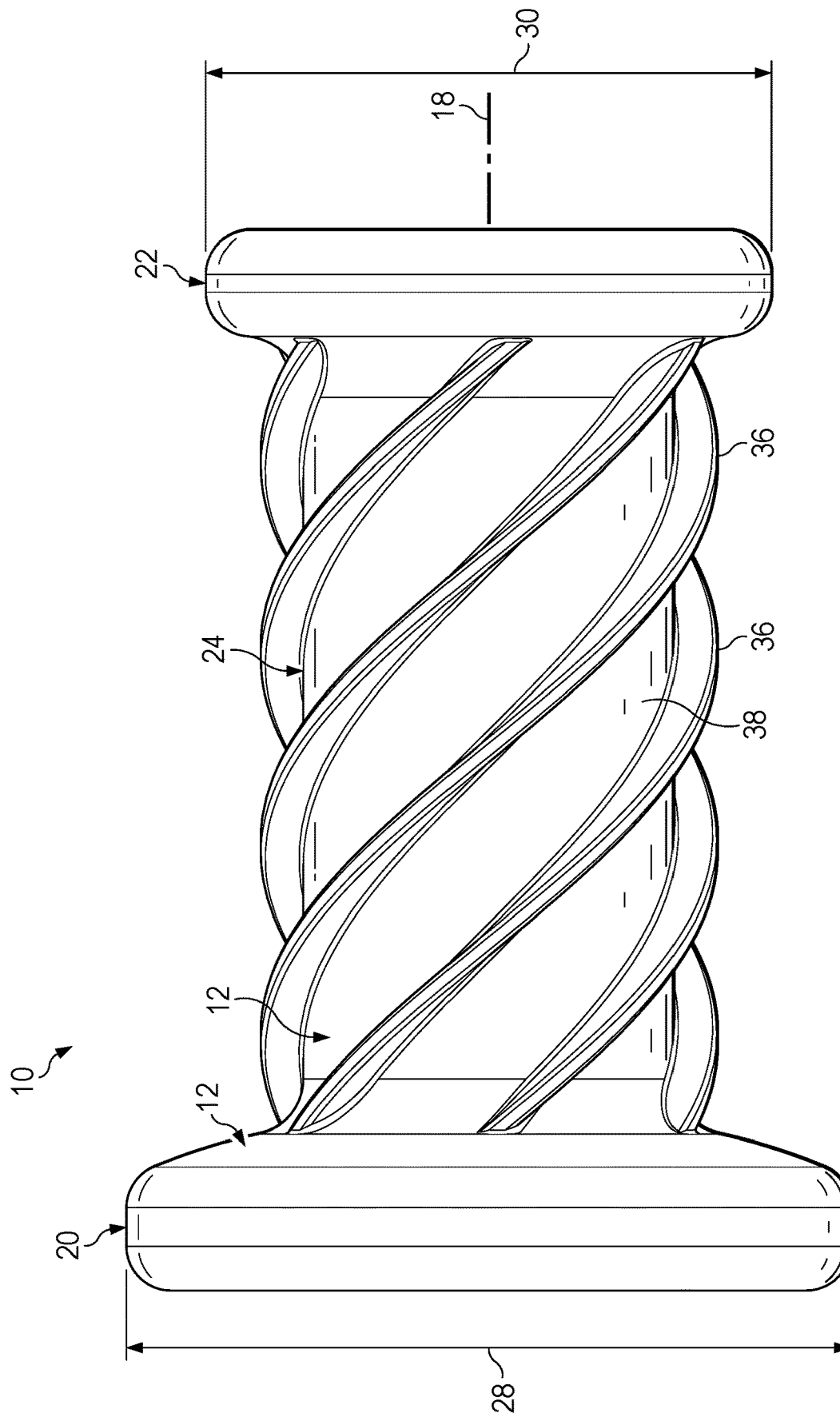
FIG. 4 is a right side elevation view of the first embodiment of the pet toy.
Figure 5:
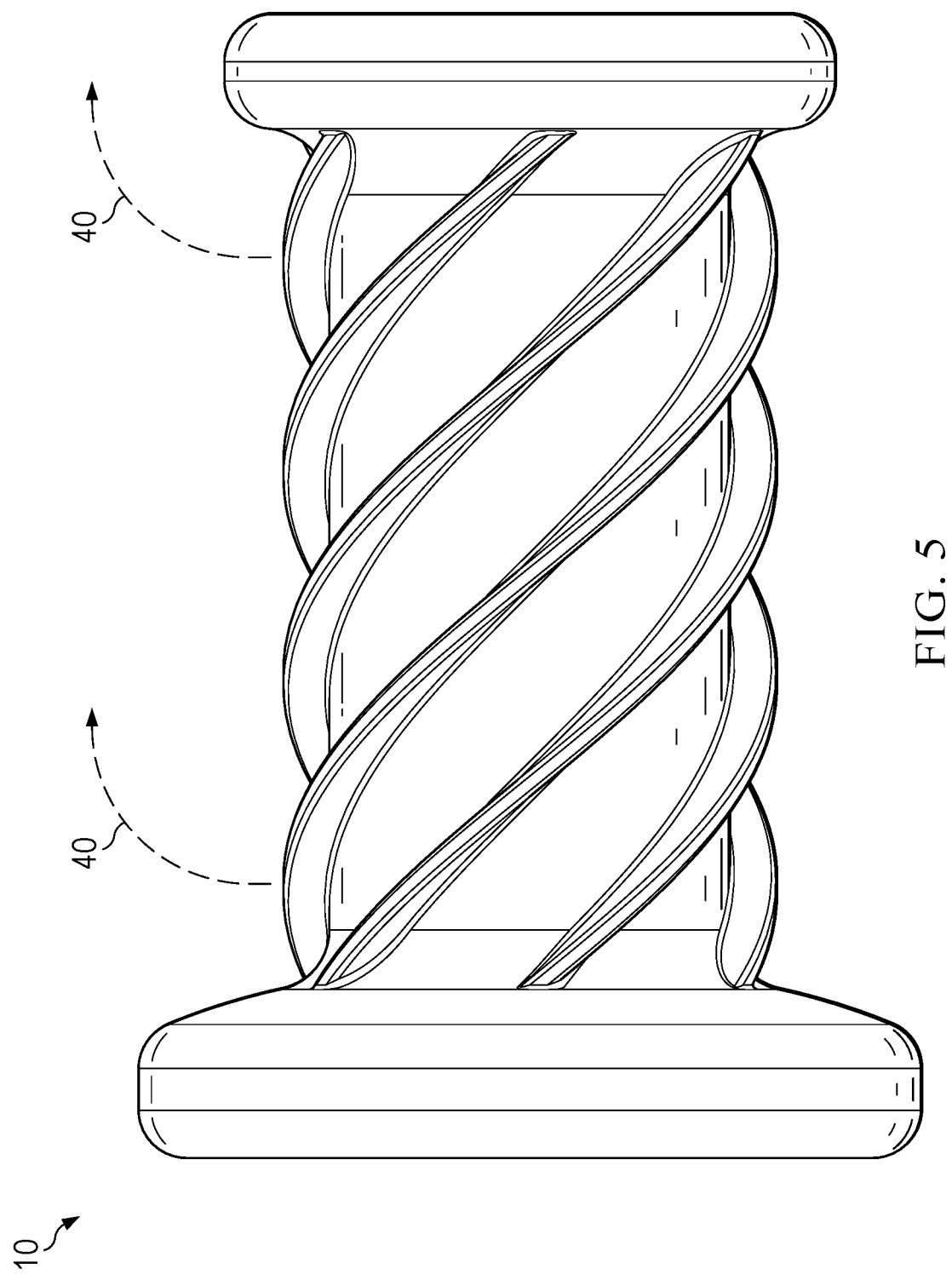
FIG. 5 is a left side elevation view of the first embodiment of the pet toy.
Figure 6:
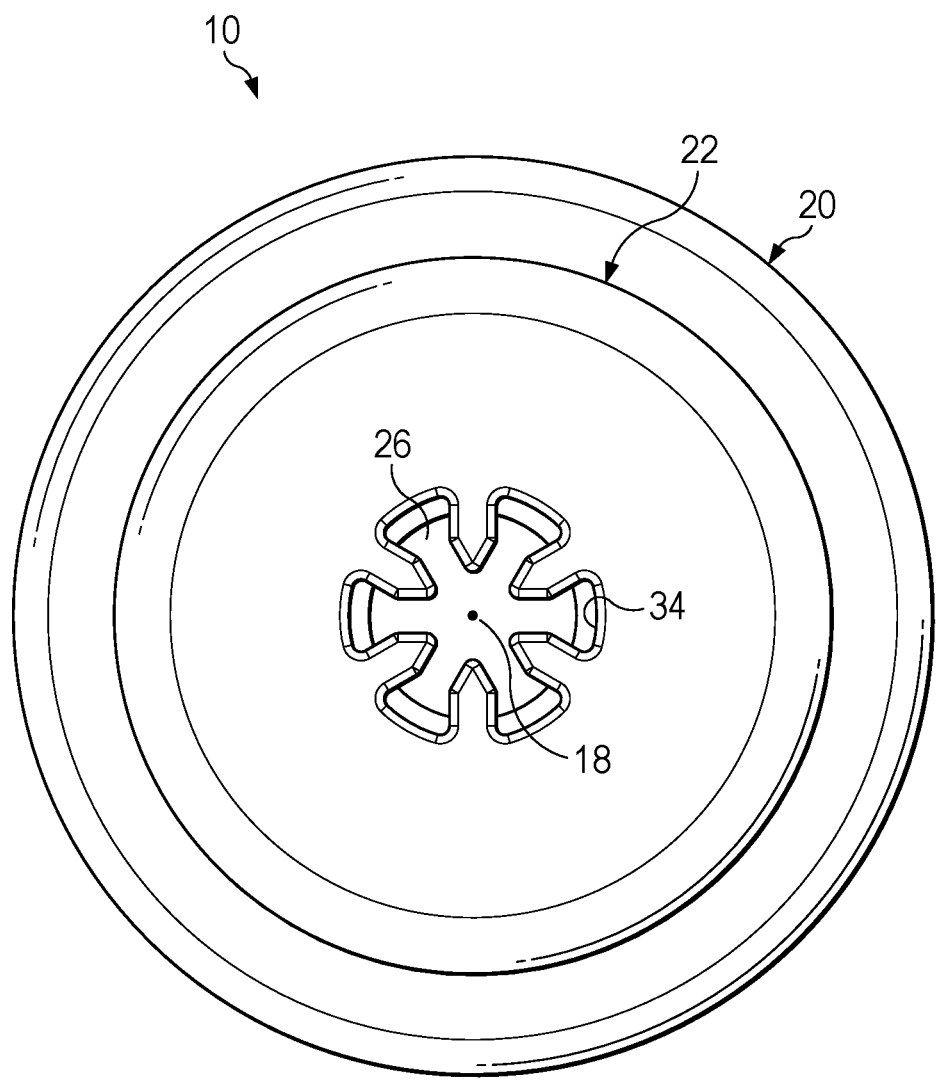
FIG. 6 is a second end plan view of the first embodiment of the pet toy.
Figure 7:
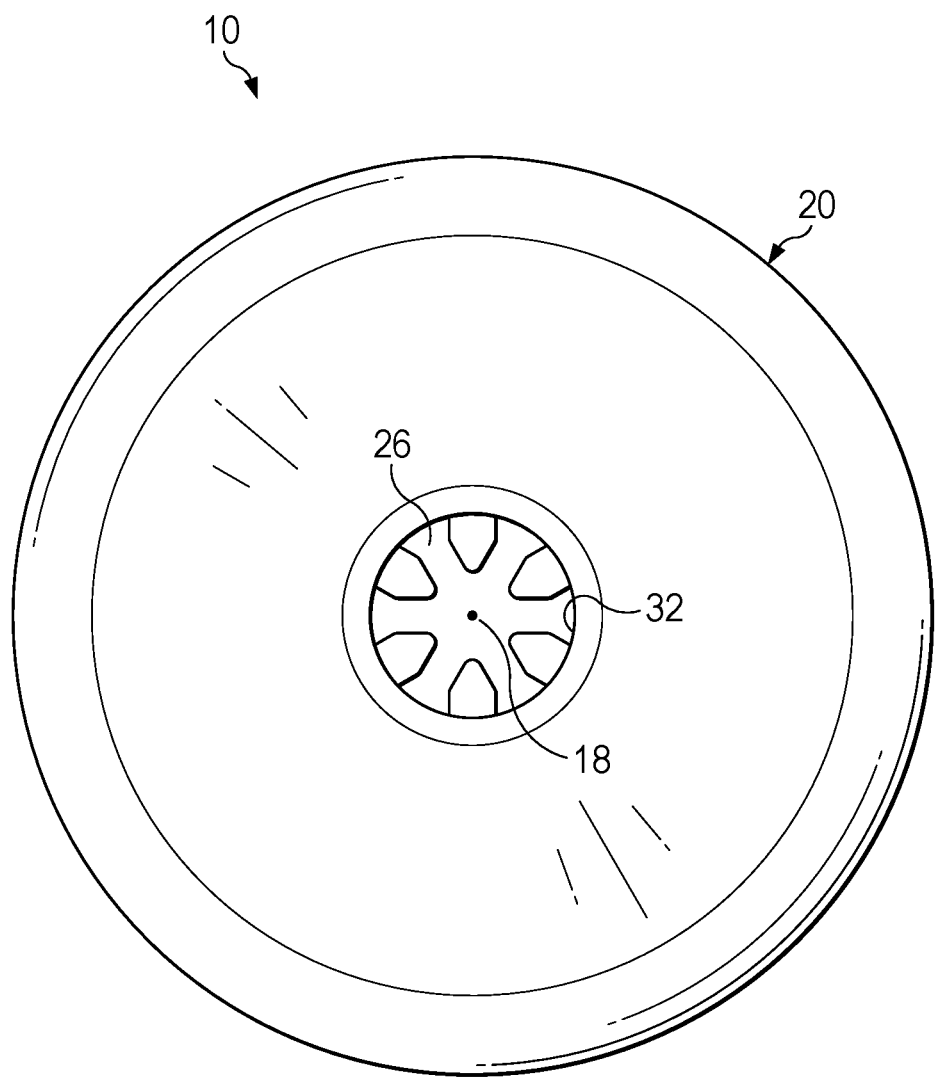
FIG. 7 is a first end plan view of the first embodiment of the pet toy.
Figure 8:
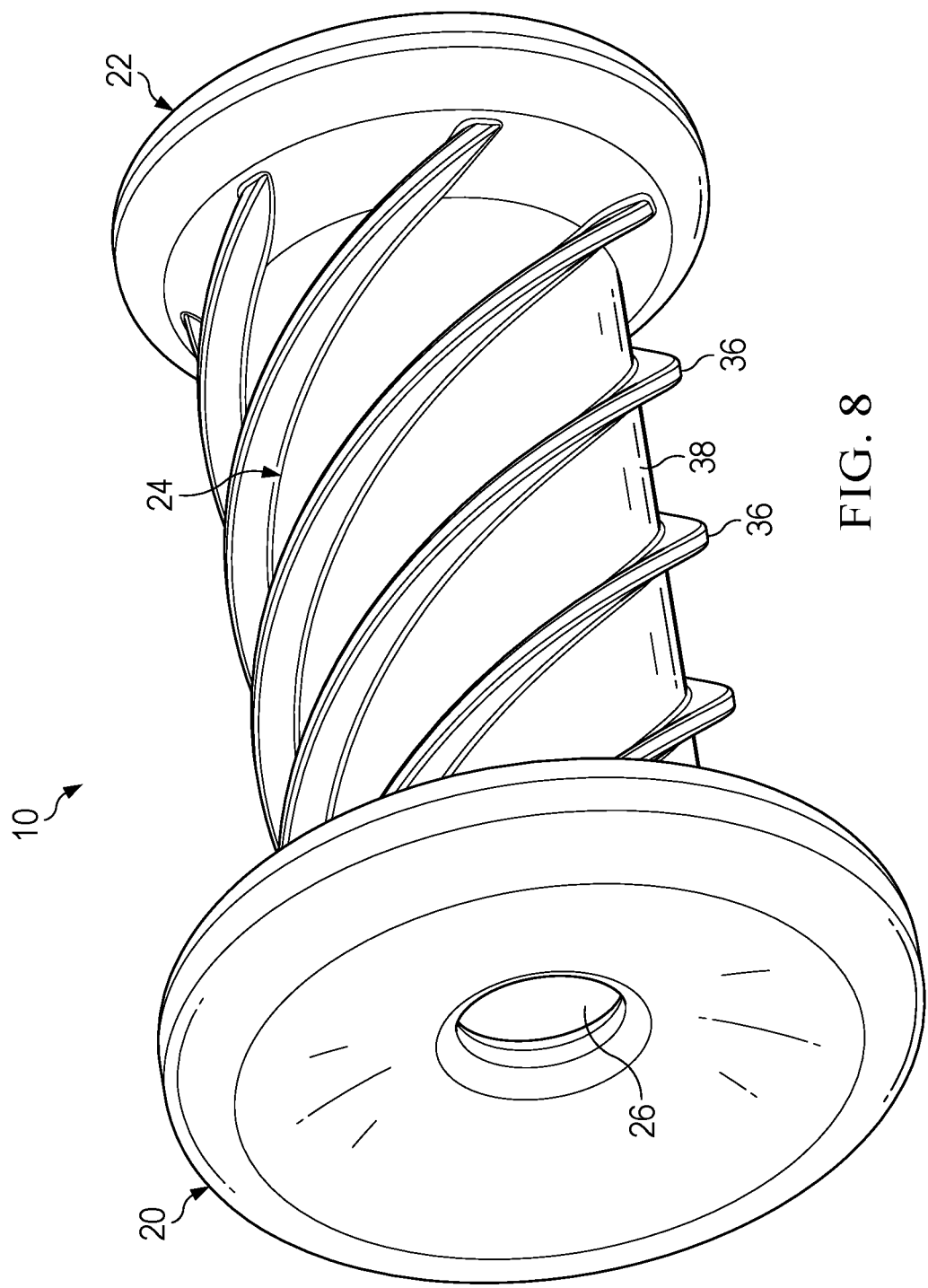
FIG. 8 is a rear perspective view of the first embodiment of the pet toy.
Figure 9:
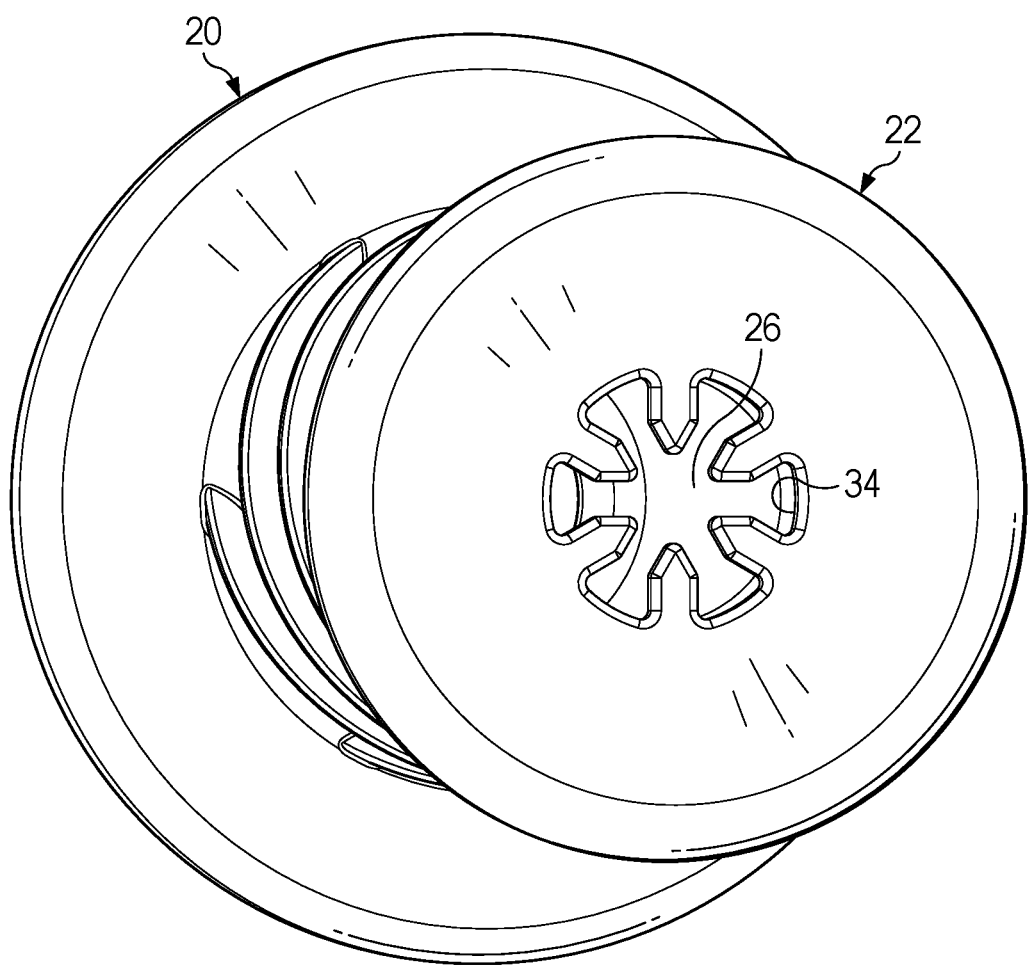
FIG. 9 is a top perspective view of the first embodiment of the pet toy.
Figure 10:
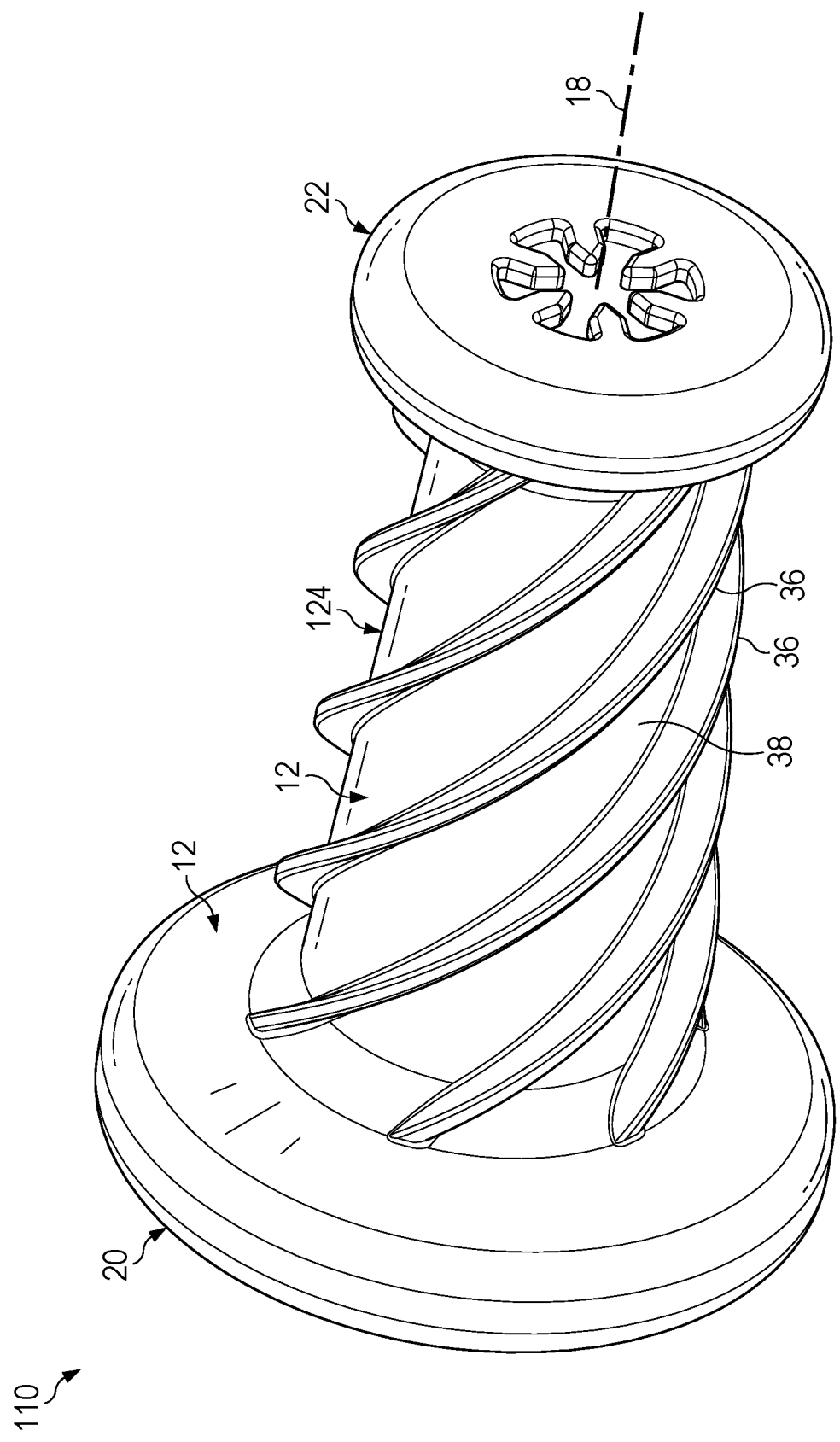
FIG. 10 is a front perspective view of a second embodiment of a pet toy.
Figure 11:
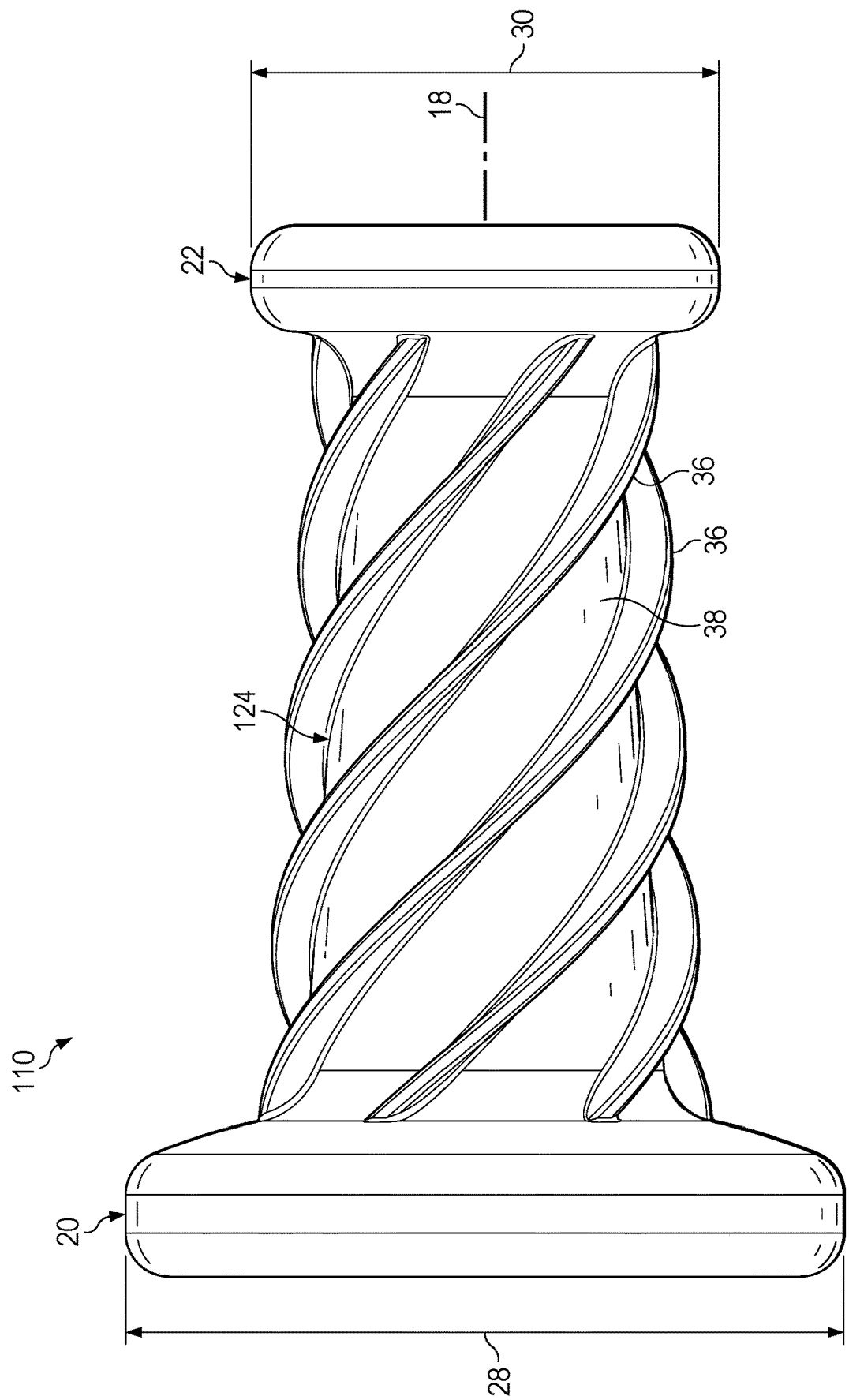
FIG. 11 is a front elevation view of the second embodiment of the pet toy.
Figure 12:
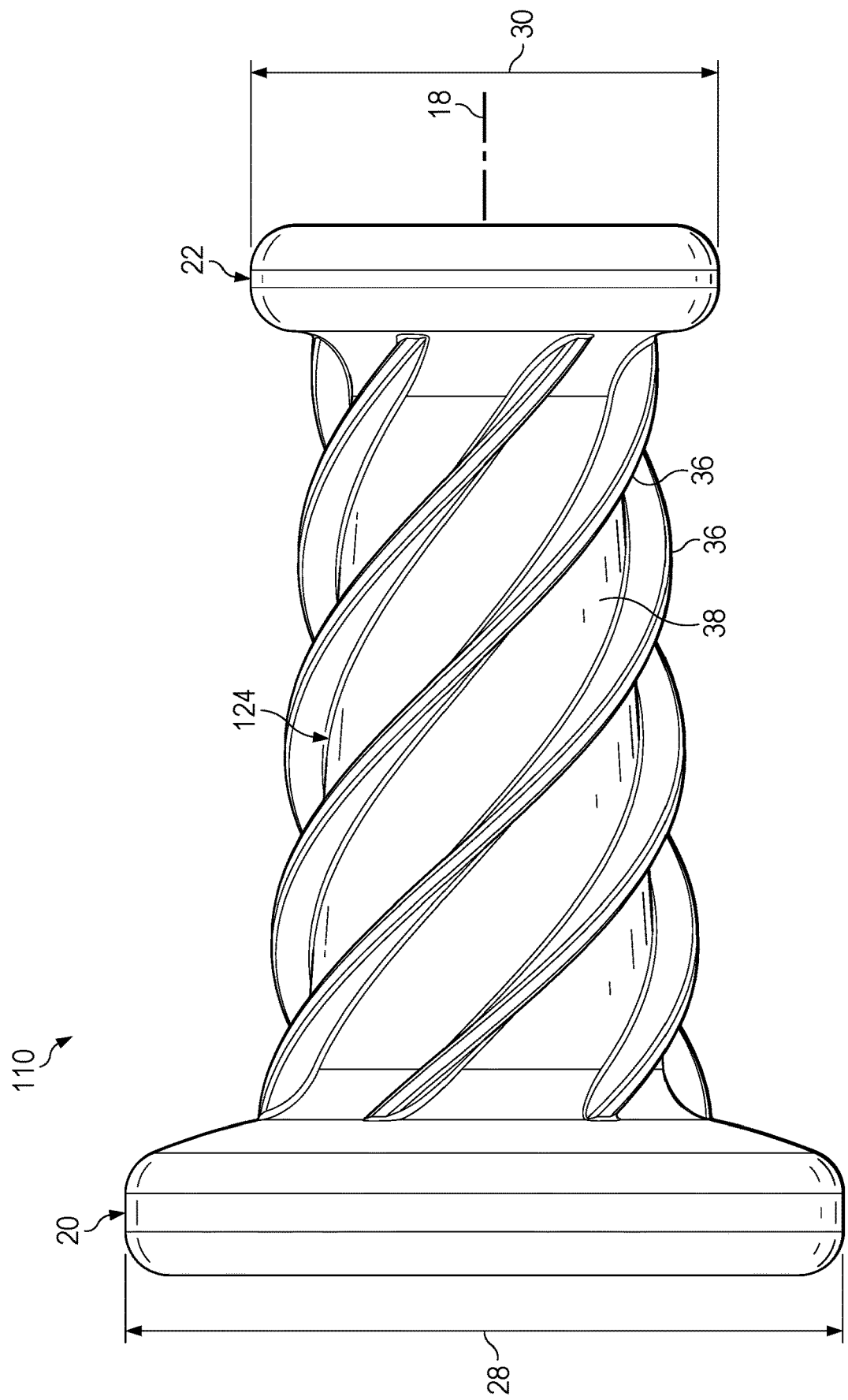
FIG. 12 is a rear elevation view of the second embodiment of the pet toy.
Figure 13:
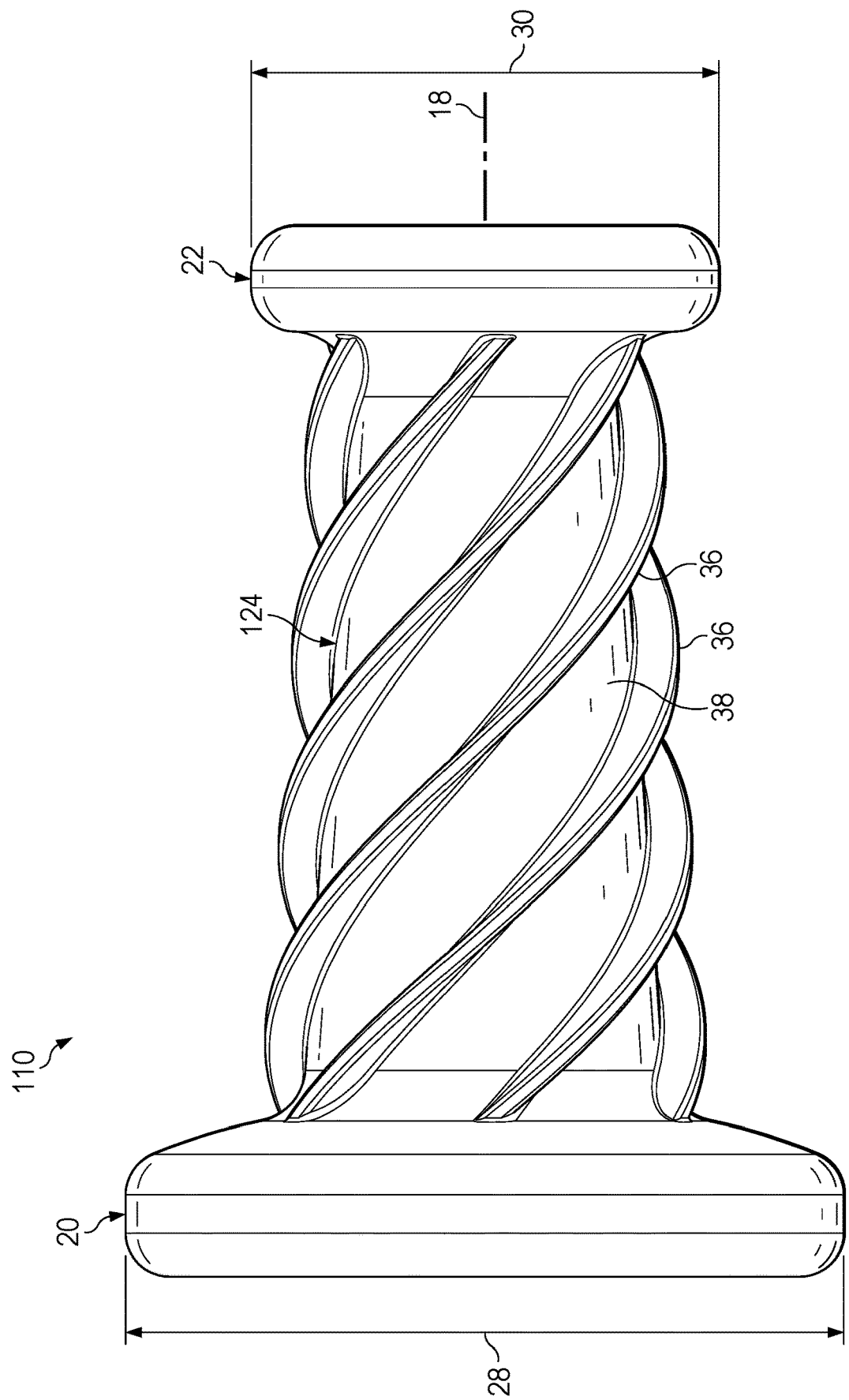
FIG. 13 is a right side elevation view of the second embodiment of the pet toy.
Figure 14:
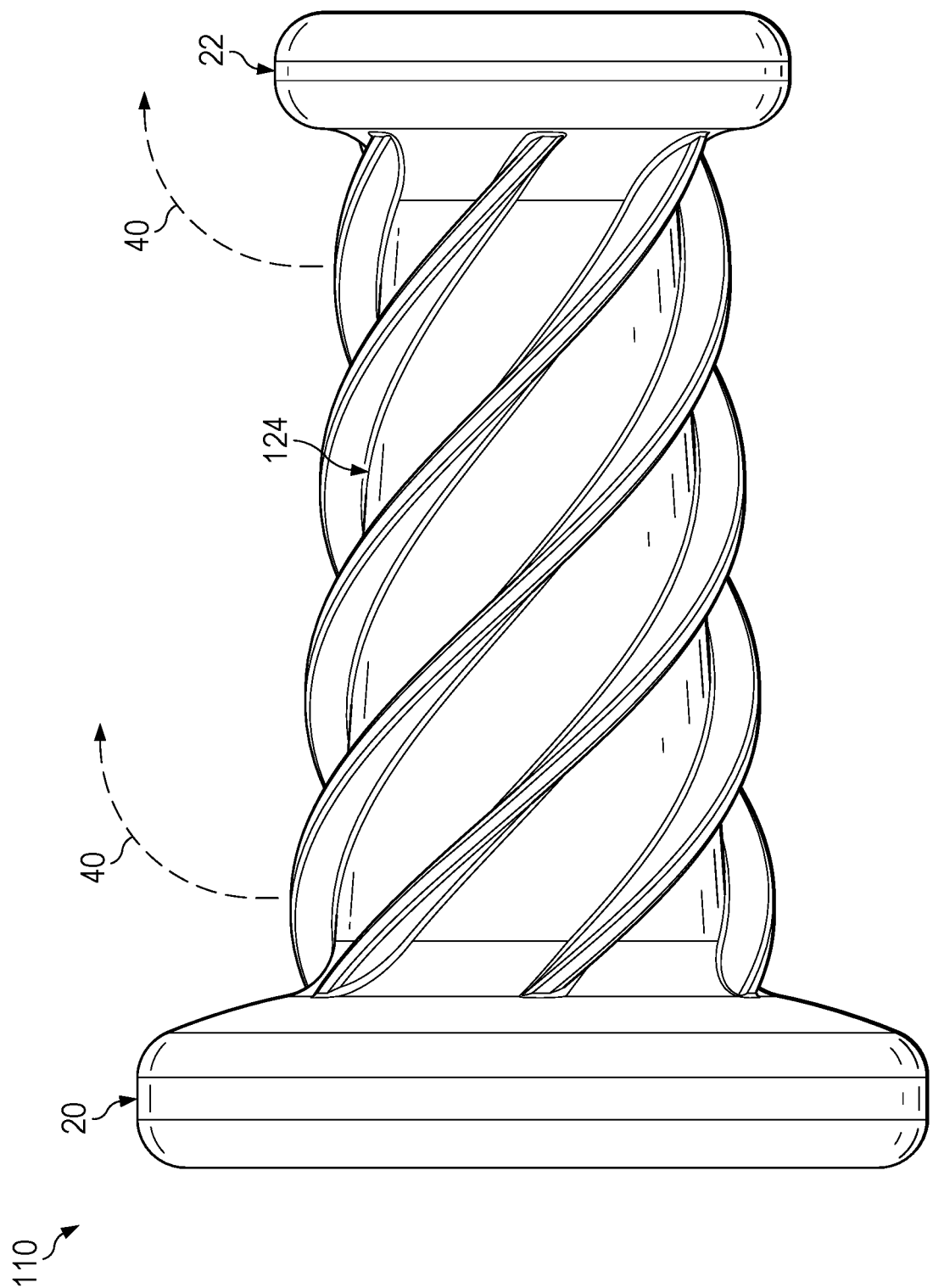
FIG. 14 is a left side elevation view of the second embodiment of the pet toy.
Figure 15:
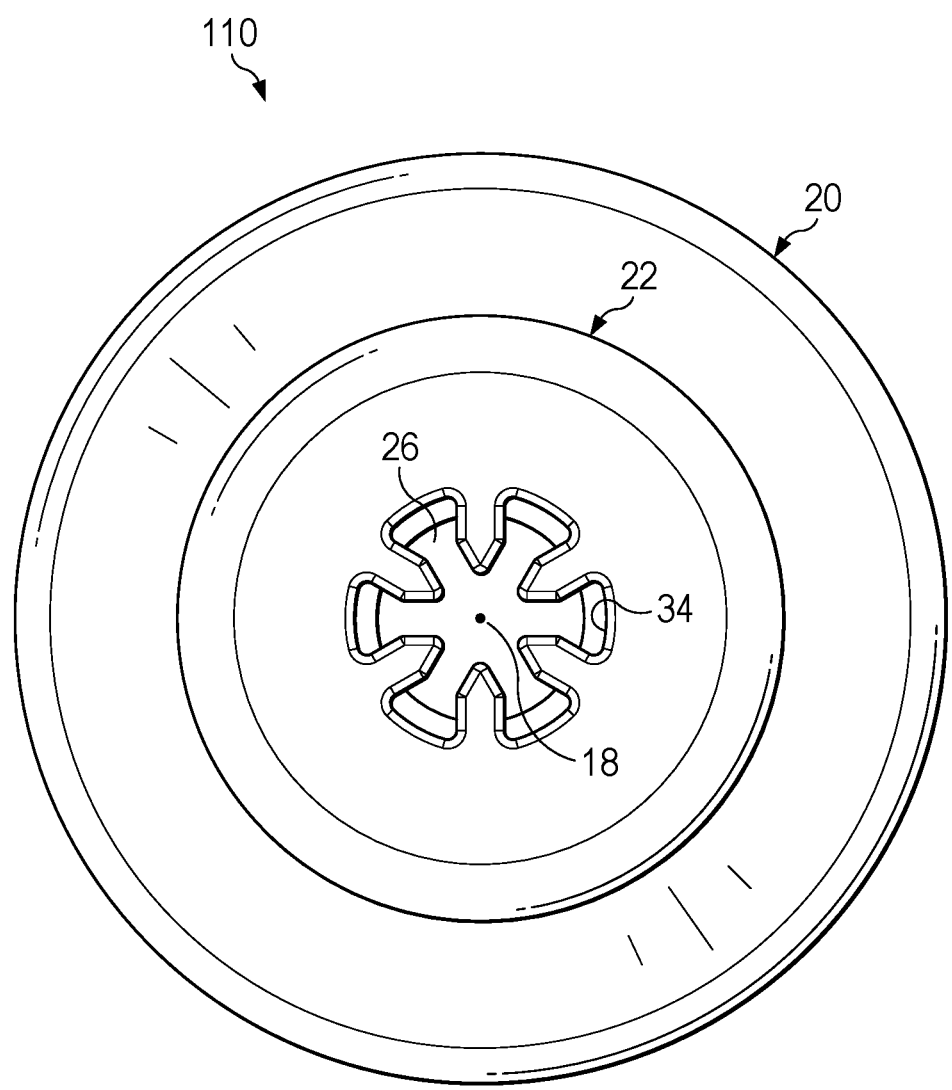
FIG. 15 is a second end plan view of the second embodiment of the pet toy.
Figure 16:
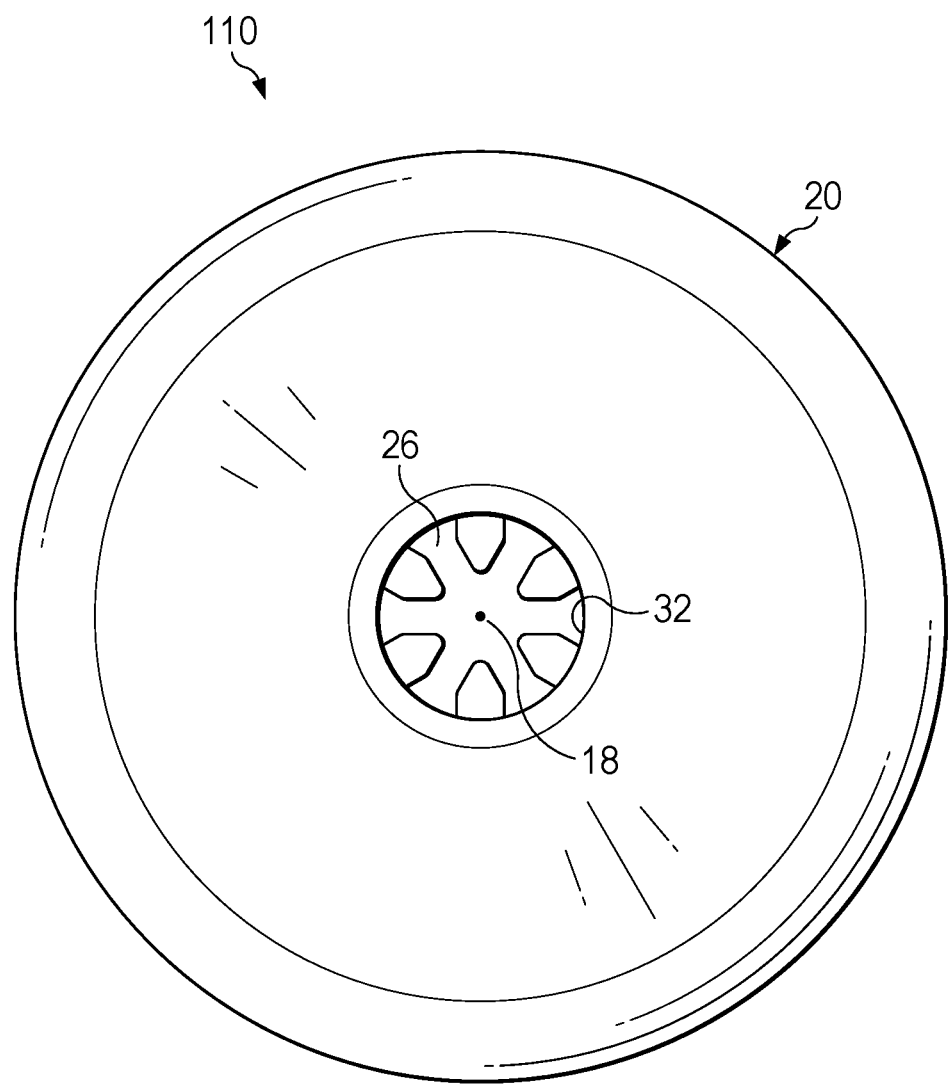
FIG. 16 is a first end plan view of the second embodiment of the pet toy.
Figure 17:
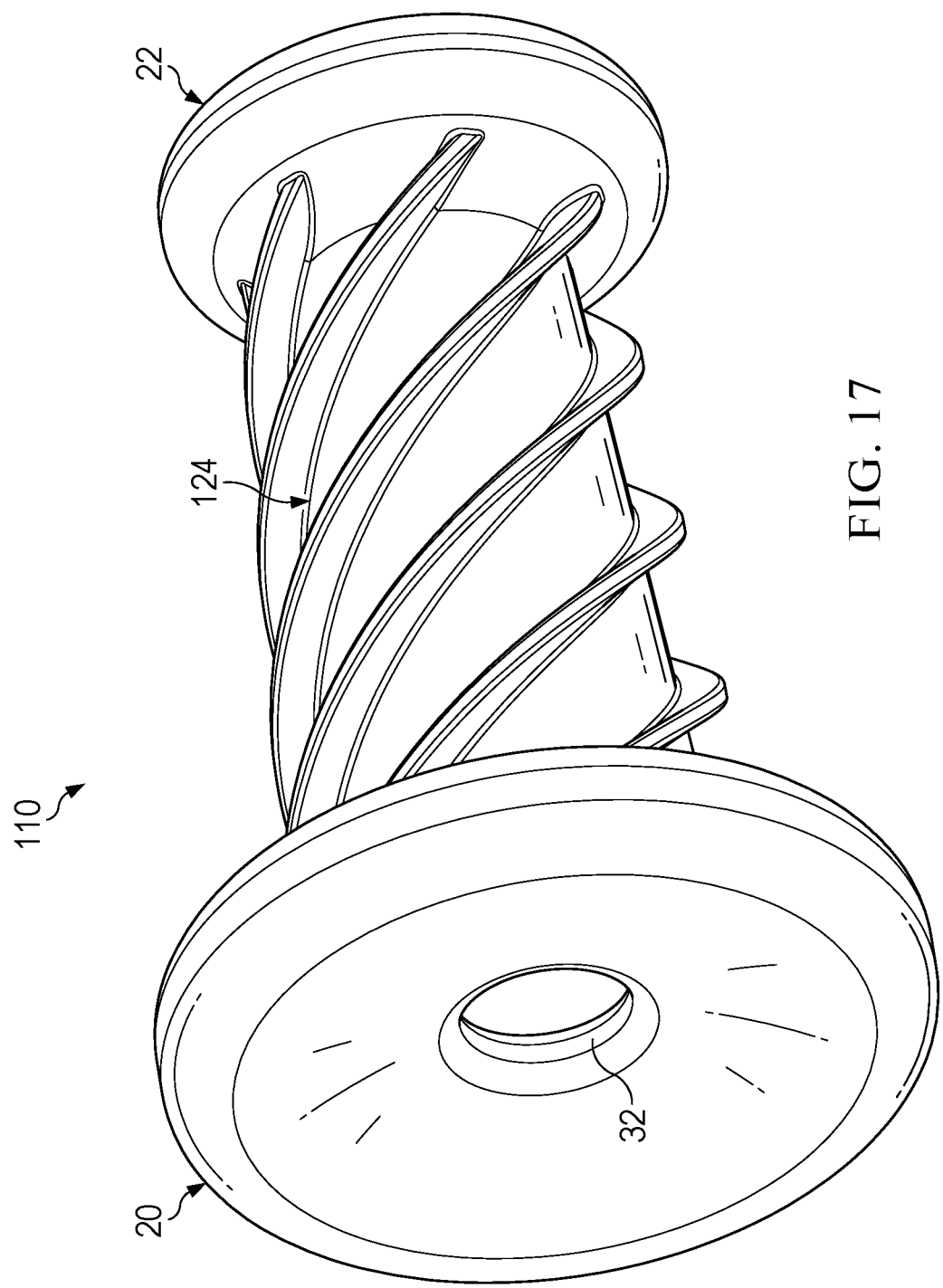
FIG. 17 is a rear perspective view of the second embodiment of the pet toy.
Figure 18:
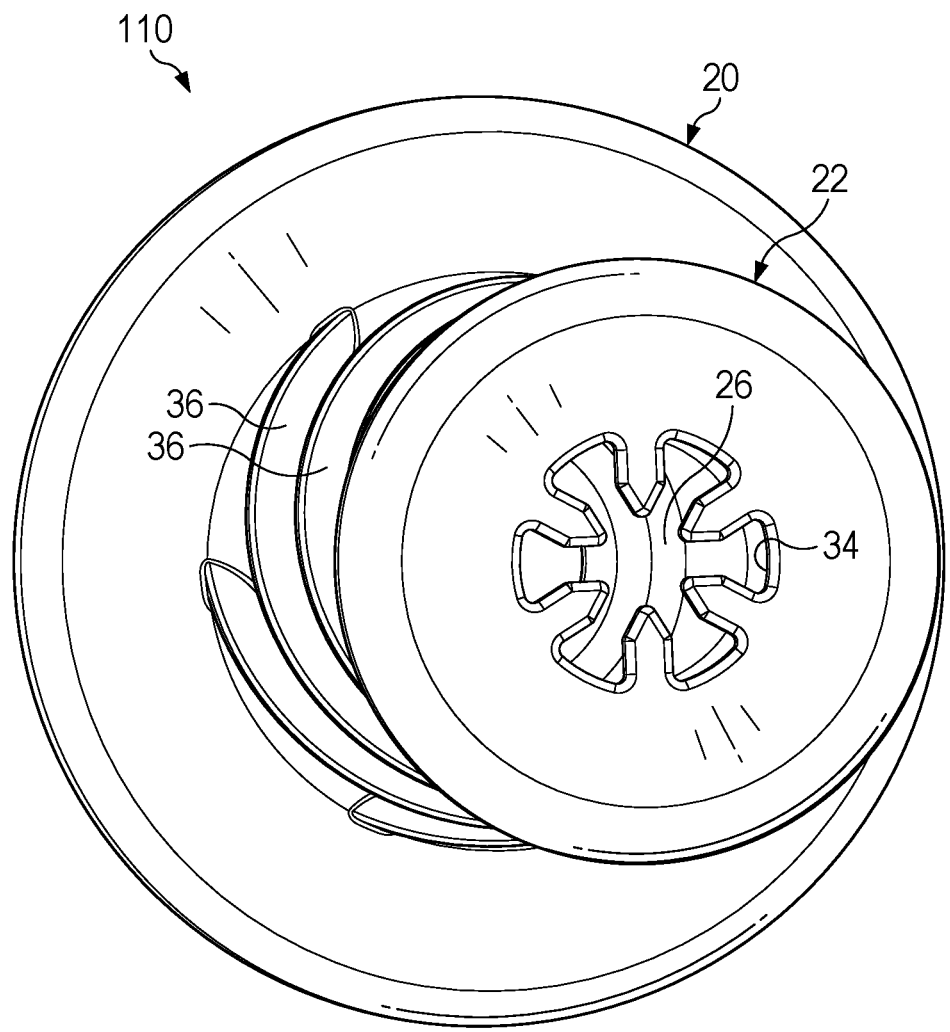
FIG. 18 is a top perspective view of the second embodiment of the pet toy.
Figure 19:
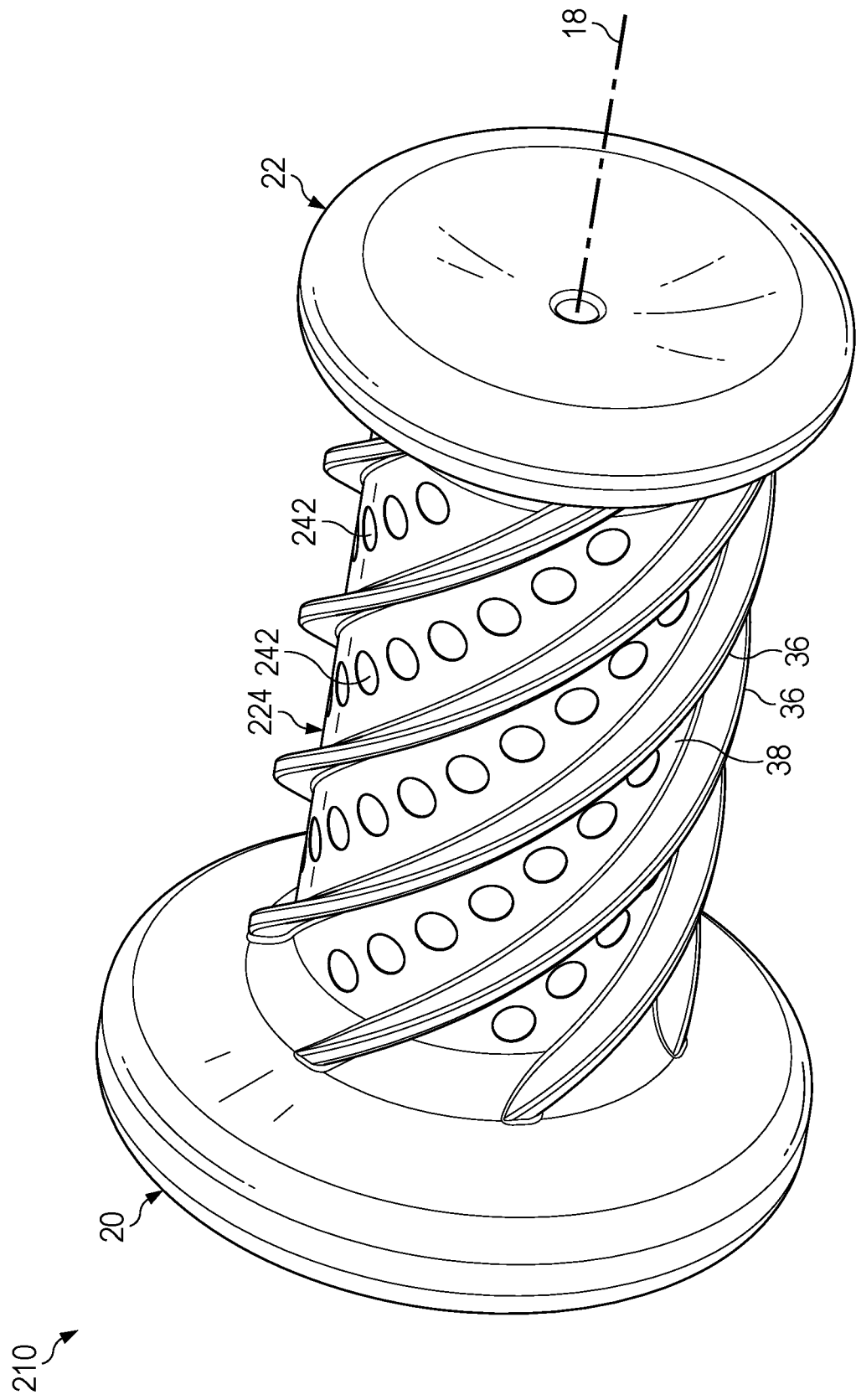
FIG. 19 is a front perspective view of a third embodiment of a pet toy.
Figure 20:
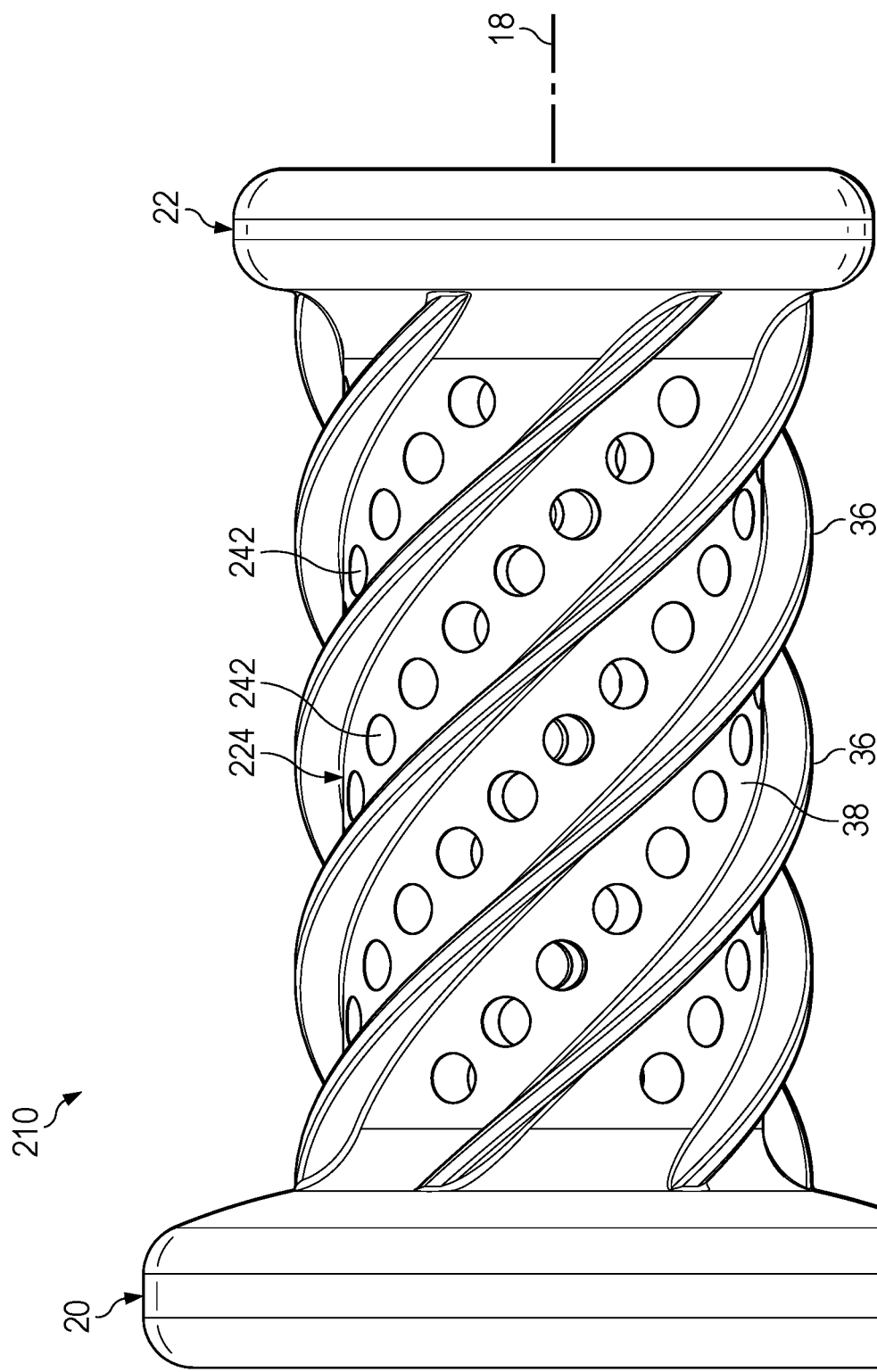
FIG. 20 is a front elevation view of the third embodiment of the pet toy.
Figure 21:
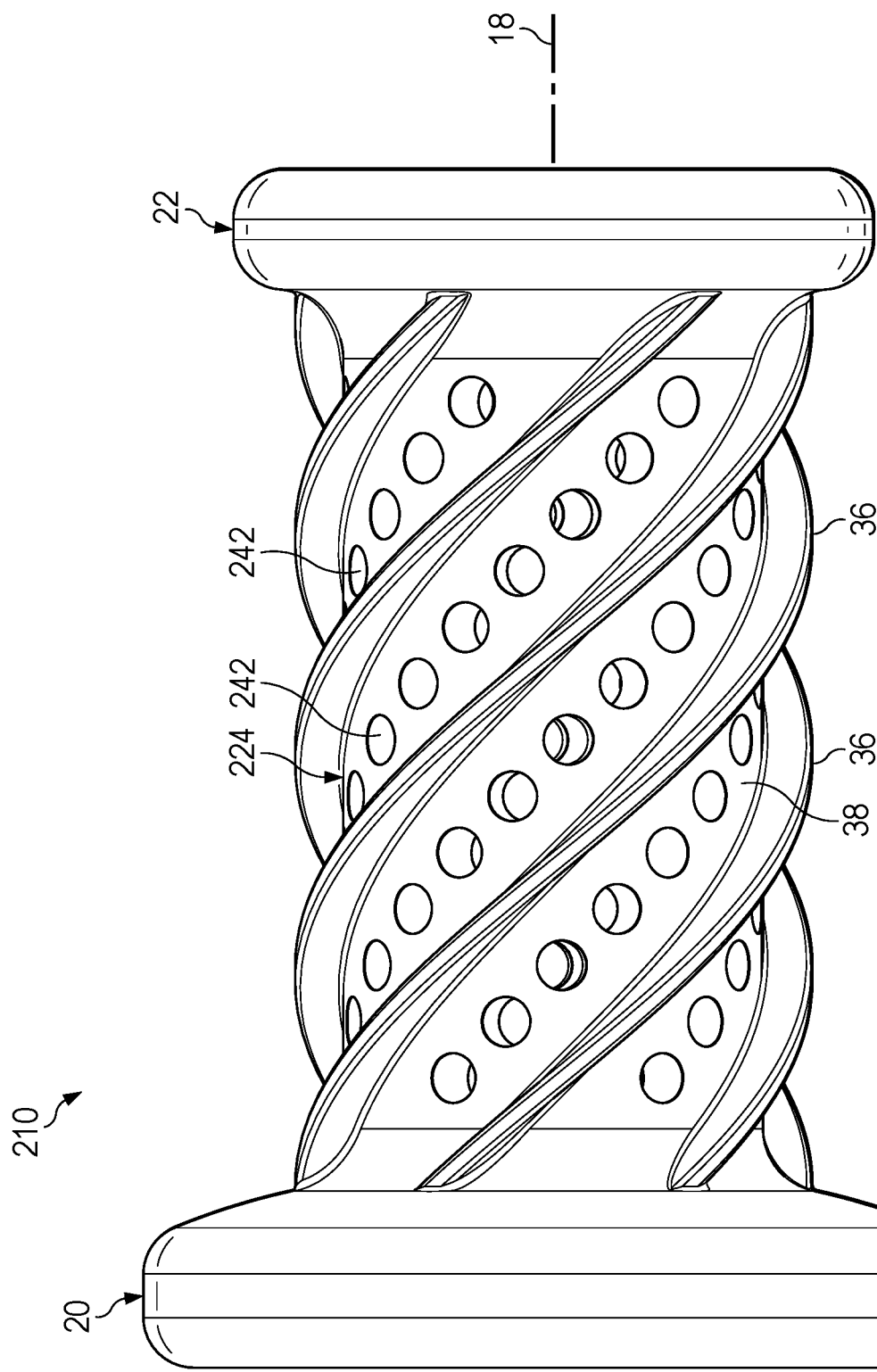
FIG. 21 is a rear elevation view of the third embodiment of the pet toy.
Figure 22:
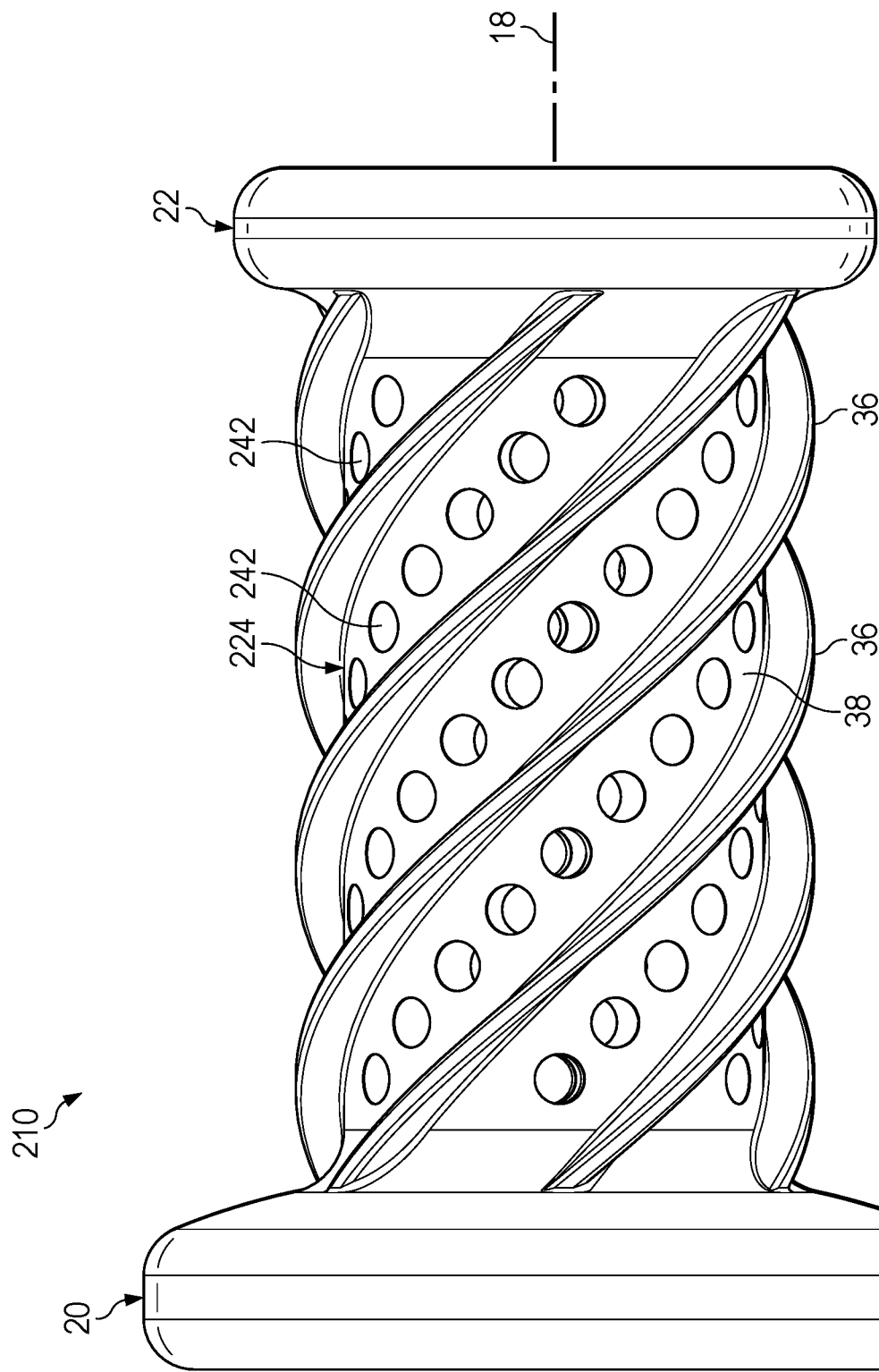
FIG. 22 is a right side elevation view of the third embodiment of the pet toy.
Figure 23:
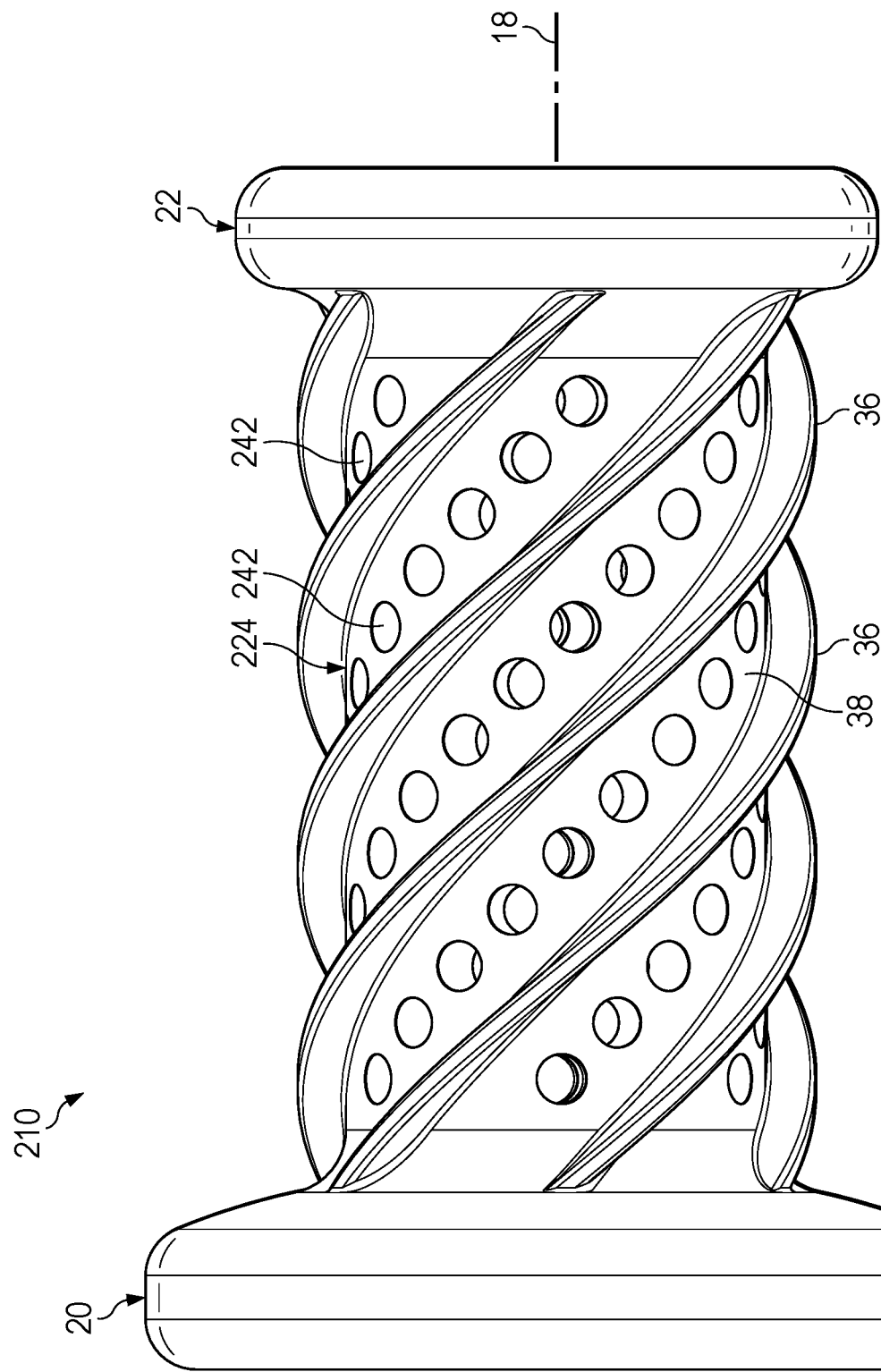
FIG. 23 is a left side elevation view of the third embodiment of the pet toy.
Figure 24:
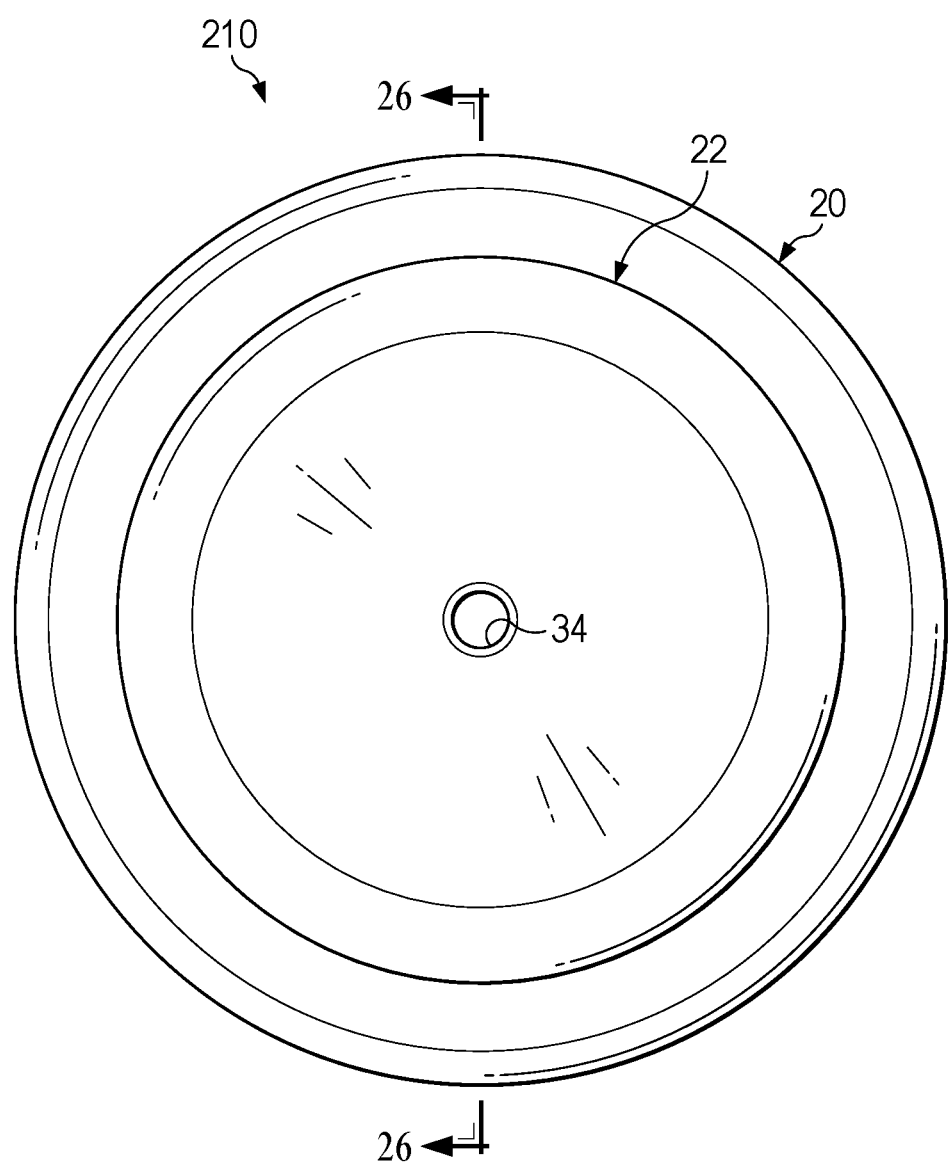
FIG. 24 is a second end plan view of the third embodiment of the pet toy.
Figure 25:
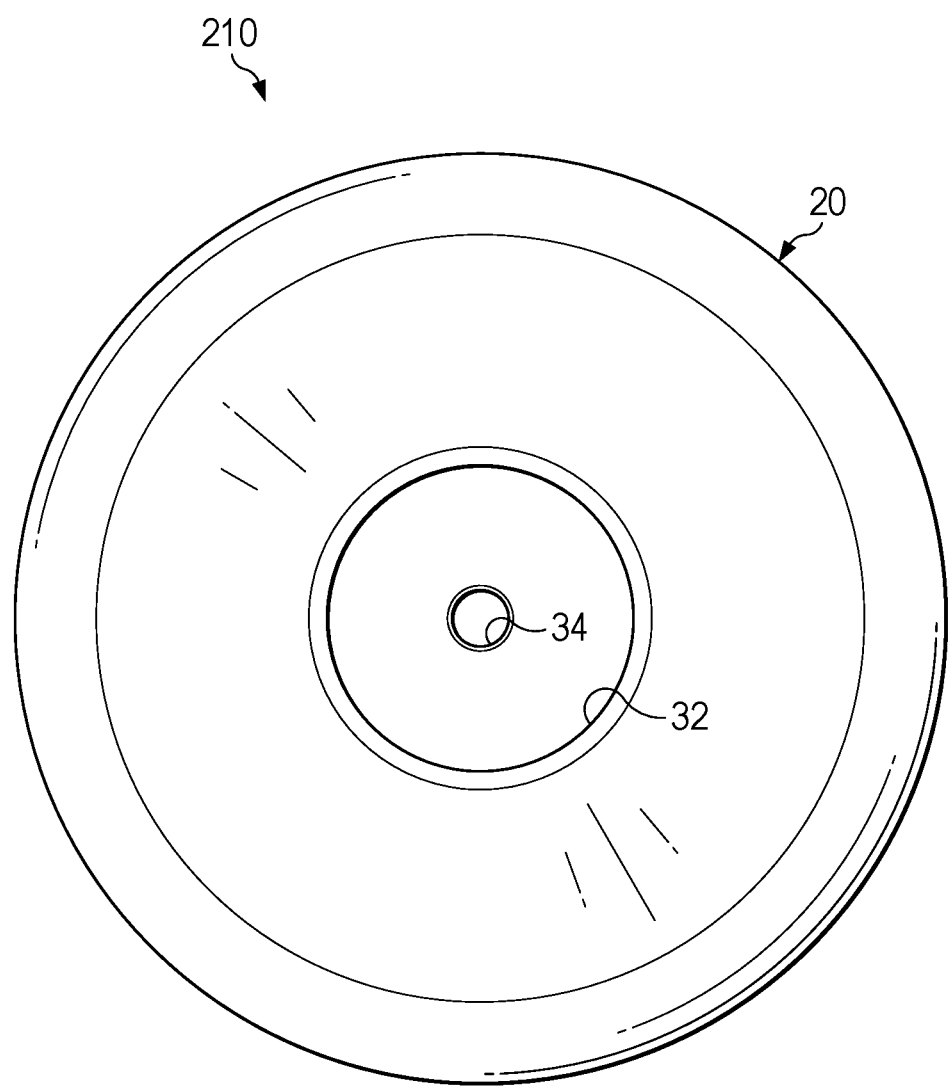
FIG. 25 is a first end plan view of the third embodiment of the pet toy.
Figure 26:
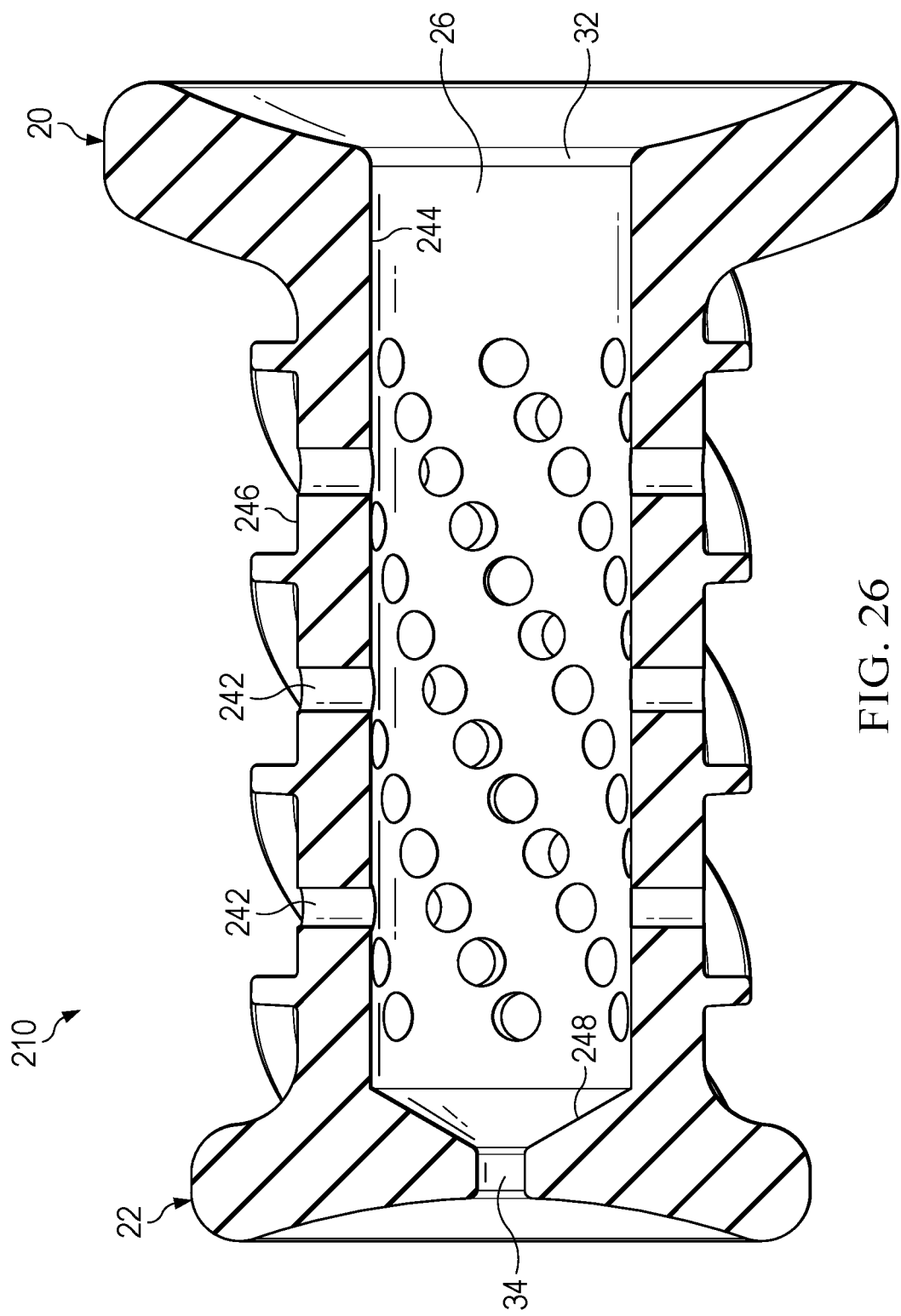
FIG. 26 is a longitudinal cross section view of the third embodiment of the pet toy.

As shown in FIG. 26, the holes 242 extend entirely through the central portion 224 from the inner surface 244 to the outer surface 246 thereof. The inner surface 244 defines the center cavity 26. The inner surface 244 may have a substantially uniform diameter along the length of the cavity 26, regardless of whether the exterior surface of the central portion 224 is straight or tapered.

Near the second end of the cavity 26, the inner surface 244 may include a tapered wall 248. The tapered wall terminates at an edge defining the circular opening 34 in the second enlarged member 22. The tapered wall tapers at an angle that complements an end a plunger, discussed infra.

Figure 27:
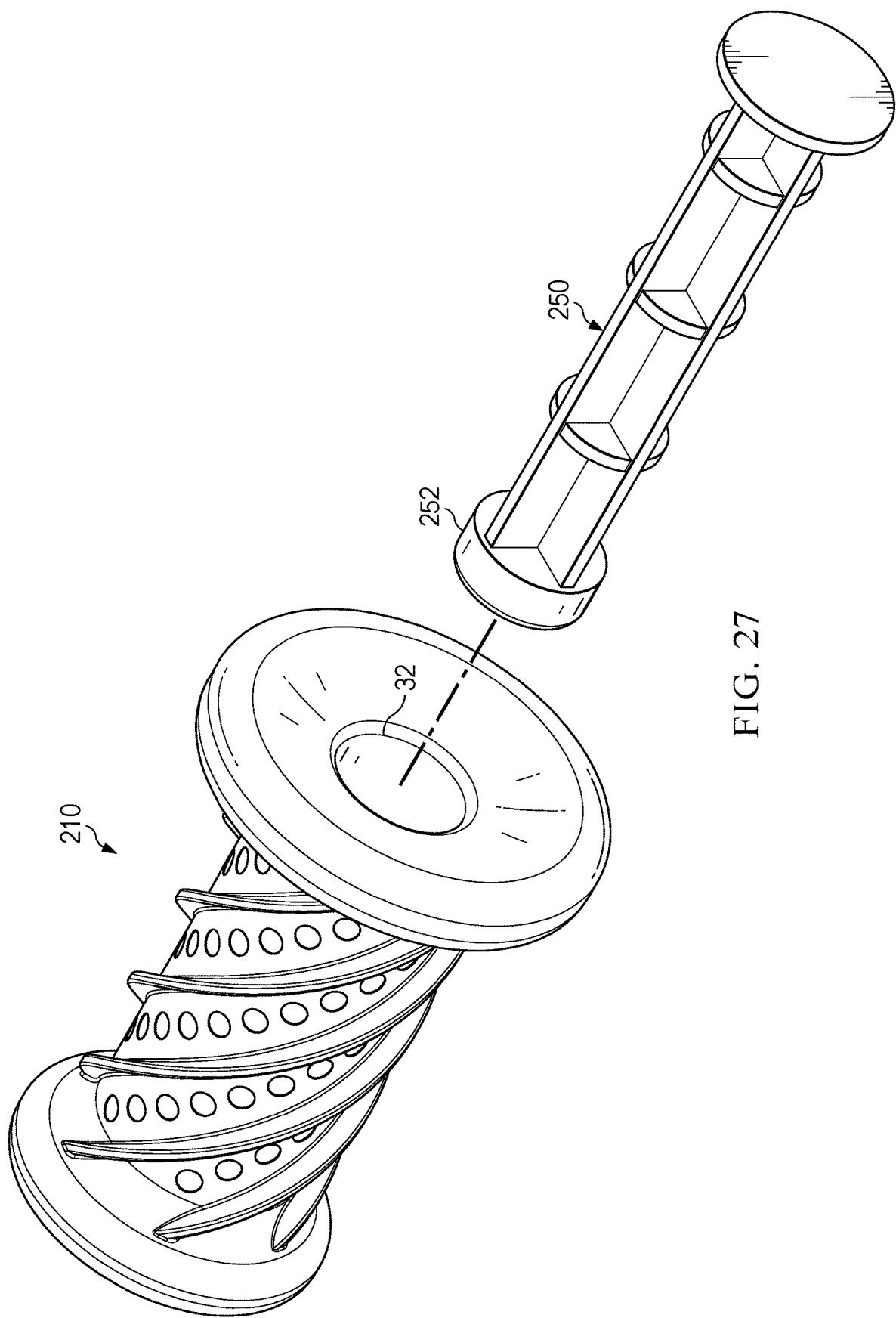
FIG. 27 is a top perspective view of the third embodiment of the pet toy and a plunger that is used therewith to eject a consumable through holes formed in the body.

With continued reference to FIG. 26 and FIG. 27, the internal center cavity 26 is configured to receive a pet treat therein. The pet toy 210 (or the other embodiments of the pet toy) can be used in conjunction with a syringe-style plunger 250. The plunger has a distal end 252 that is shaped with a tapered surface that complements or matches the angle or orientation of the tapered wall 248 in the elongated central portion 224. Further, the diameter of the distal end 252 of the plunger complements or matches the inner diameter of the inner surface 244 of the elongated central portion 224.

In one embodiment, the distal end 252 of the plunger 250 is where the plunger interfaces with a material (e.g., pet treat or medication) inside of bore or cavity, such as cavity 26. The distal end 252 of the plunger 250 typically has a generally conical shape. This conical surface serves several purposes. When the plunger 250 is pushed into the bore or cavity 26, the conical tip of distal end 252 creates a tight seal against the inner walls or inner surface 244 that defines cavity 26. As the plunger 250 is pushed, the conical surface of distal end 252 helps move the material through the cavity 26. The conical shape also minimizes the dead space to ensure that the maximum amount of material can be expelled or ejected from the pet toy.

In operation, a user will load a pet treat into the center cavity 26 of the pet toy. This occurs by inserting the pet treat through the opening 32 formed in first enlarged member 20. In one exemplary embodiment, the pet treat may be in the form of a paste or paste-like treat material that is contained or sold in a flexible tube. The end of the flexible tube can be cut or otherwise torn to create an opening in the flexible tube storing the treat material. The opened flexible tube is then inserted into the cavity 26. Then, the tube is squeezed to dispense the paste or paste-like treat material into the cavity 26. Alternatively, a user may apply a pinching force between the flexible tube and the sidewall or edge defining opening 32. Then, with the tube pinched against the edge, pulling the flexible tube out of the cavity 26. The pinched tube will cause the paste or paste-like treat material to exit the open end of the flexible tube in response to pulling the flexible tube through the pinched region, and thereby dispose the treat material in the cavity 26.

After loading the paste or paste-like treat material into the inner cavity 26, then a user can align the length of the plunger 250 axially along the axis 18, as shown in FIG. 27. In this orientation, the distal end 252 of the plunger 250 is closer to the pet toy 210 than the proximal end of the plunger

250. As such, the plunger is moved closer to the first end of the pet toy 210. The plunger 250 continues to move toward the pet toy 210 until the distal end is inserted through the opening 32 in the first enlarged member 20. The diameter of the distal end 252 may also match, equal or complement the diameter of the of the opening 32. This allows the plunger to be inserted through opening 32. A user continues to apply force to the proximal end of the plunger 250 along axis 18.

With the distal end 252 of plunger 250 now in the central cavity 26, a user will continue to apply force along axis 18 to push the plunger 18 further into the cavity 26. Recall, the pet treat will have already been inserted into the central cavity 26 before the plunger 250 is inserted into the cavity. Thus, as the user pushes the plunger 250 deeper into the cavity 26, the pet treat will be expelled through, ejected from, or dispensed from holes 242. This expulsion or dispensation of the treat will dispose the treat on the exterior surface 246 of the elongated central portion 224. The pet can then lick or eat the treat that has been disposed on the exterior surface 246 of the elongated central portion 224.

Due to the use of the plunger to dispense the treat, it is preferable that the treat be a semi-solid or viscous material to effectuate the dispensation, rather than a hard, solid or non-viscous material. In one particular embodiment, an exemplary treat that is used with the pet toys of the present disclosure and plunger 250 is peanut butter. Peanut butter is suitable as it is a non-Newtonian fluid that exhibits shear-thinning behavior. However, other more viscous Newtonian or non-Newtonian fluids (e.g., gels) are entirely possible. For example, this assembly can be used with yogurt, cottage cheese, custard, oatmeal, or other more viscous foodstuffs that are unharmful and/or beneficial to pets. These are all examples of paste or paste-like treat material. This paste or paste-like treat material could also be used to dispense medicine to the pet when the medicine is integrated into the treat. For example, medicine for a dog can be impregnated into the treat such that the dog consumes the medicine in response to licking or eating the treat. Additionally, supplements can be incorporated into the pet treat. For example, a variety of pet supplements can be incorporated into the paste or paste-like treat material for dispensing from the inner cavity, such as Glucosamine, Coenzyme Q10 (CoQ10), Omega-3 Fatty Acid, Multivitamins, Probiotics, Calcium, or the like.

In one particular example, when the treat is a paste or paste-like material, such as peanut butter or yogurt, as the plunger moves axially along axis 18, it creates shear forces within the peanut butter. These shear forces cause the paste material (e.g., peanut butter) to behave like a non-Newtonian fluid—its viscosity changes under stress. The increased pressure from the plunger 250 forces the paste or paste-like treat material to flow. Due to the radial holes 242, the paste or paste-like treat material starts moving outward from the central bore or cavity 26. The holes 242 act as channels, allowing the paste or paste-like treat material to escape. As the plunger 250 continues to push, the paste or paste-like treat material flows through these holes 242. In one exemplary embodiment, when the shear forces increase (due to plunger 250 movement along axis 18), the paste or paste-like treat material becomes less viscous. This allows the paste or paste-like treat material to flow more easily through the holes 242. The paste or paste-like treat material's consistency changes from stiff to less stiff as it is pushed out of the holes 242. This combination of the pet toy, the plunger 250 and the paste or paste-like treat material may be used for dispensing paste or paste-like treat material in a controlled manner. By adjusting the plunger force along axis 18, the user (i.e., pet owner) can control the rate of paste or paste-like treat material flow through the holes 242.

To estimate the force required to expel the paste or paste-like treat material from the pet toy, a manufacturer of the pet toy should consider the shear stress needed to push paste or paste-like treat material through the holes 242. Shear stress depends on factors like hole 242 diameter, paste or paste-like treat material viscosity, and pressure. The amount of force that a user should apply to plunger 250 will depend on hole 242 diameter (e.g., smaller holes require more force due to increased shear stress), paste or paste-like treat material consistency (e.g., runnier paste or paste-like treat material flows more easily), and plunger design (e.g., the shape, diameter and/or and surface area of the distal end of the plunger).

It has been determined that some beneficial configurations of the pet toy can account for the diameter of the holes 242 relative to the inner diameter of the center cavity (i.e., measured between two points on the inner surface orthogonal to axis 18). In one exemplary embodiment, the holes 242 may have a diameter that is in a range from about 3 millimeters to about 9 millimeters. In one particular embodiment, the holes 242 have a diameter that is about 5 millimeters.

In one exemplary embodiment, the inner diameter of cavity 26 measured across the inner surface 244 may be in a range from about 22 millimeters to about 32 millimeters. In one particular embodiment, the inner diameter of cavity 26 is about 27 millimeters (about 1 inch). However, this diameter be smaller when the pet toy is marketed for smaller pets, such as cats. For example, for smaller animals/pets, the inner diameter of cavity 26 measured across the inner surface 244 may be in a range from about 7 millimeters to about 15 millimeters.

The ratio of the inner diameter of cavity 26 to the diameter of the holes (e.g., holes 242 or other holes shown herein) may be in a range from about 3:1 to about 7:1. In one particular embodiment, the ratio of the inner diameter of cavity 26 to the diameter of the holes (e.g., holes 242 or other holes shown herein) is about 5:1 (e.g., about 27:5). It has been found that these ratios are beneficial to balance the amount of force required to expel the paste or paste-like treat material from the bet treat without sacrificing functional sealing that the holes provide when the plunger is not inserted in the pet toy such that the paste or paste-like treat material does not inadvertently leak.

The dimension of the distal end 252 of the plunger 250 that matches the center cavity 26 is beneficial to clean the inner surface 244 as the treat is dispensed. Much like a plunger would effectively clean the cylinder of a syringe as medicine is dispensed, the distal end 252 of the plunger 250 moves along the inner surface in a tight sliding frictional engagement to effectively scrape the inner surface 244 to leave a clean surface after the distal end 252 of the plunger has passed.

This distal end 252 of the plunger 250 continues to be pressed toward the second end of the pet toy 210 toward the second enlarged member 22 until the tapered wall on the distal end 252 meets the tapered wall 248 on the inner surface 244. As the tapered wall on the distal end 252 meets the tapered wall 248 on the inner surface 244 and remaining treat is expelled or dispensed from the opening 34 in the second enlarged member 22.

FIGS. 28-30 depict that pet toy 310 may include one or more apertures or holes 342 that extend entirely through body 12 at the elongated central portion 324. The elongated central portion 324 of pet toy 310 can be either a tapered cylindrical shape (e.g., similar to pet toy 110) or a straight cylinder (e.g., similar to pet toy 10).

The holes 342 extend radially relative to axis 18. The holes 342 may define one or more holes that are in open communication with the internal center cavity 26 of the elongated central portion 324. This embodiment differs in that the ridges 336 extend in a linear manner (i.e., non-helical) between the first enlarged member 20 and the second enlarged member 22. The interstitial space 338 is also linearly elongated.

The holes 342 may extend in the linear pattern in the interstitial space 338 located between adjacent ridges 336. In the shown embodiment, the holes 342 are located in only some of the spaces 338 between adjacent ridges 336. In this particular embodiment, the purpose of only forming holes 342 is some of the spaces 338 is for ease of manufacture. Namely, if pet toy 310 is molded product, then forming the molds with many holes 342 can be difficult or costly to produce. Therefore, pet toy 310 provides a suitable alternative in which the holes 342 are suitable for ejecting the pet treat form the center cavity in the manner previously described with the plunger 250 but also reduces manufacturing costs.

Particularly, the shown example of pet toy 310 depicts holes 342 on only two sides of the elongated central portion 324. This is beneficial when the pet toy 310 is molded from two molds that join at a parting line. It is possible for the holes 342 on each side of the pet toy 310 to all have the same diameter or to have different diameter. The particular configuration shown in FIGS. 28-30 depicts a first set of holes 342A formed on a first side of the elongated central portion 324 that have a larger diameter than a second set of holes 342B on a second side of the elongated central portion 324. In some exemplary embodiments, the set of holes 342A may have a diameter that is in a range from about 3 millimeters to about 9 millimeters. In one particular embodiment, the set of holes 342A have a diameter that is about 5 millimeters. In some exemplary embodiments, the set of holes 342B may have a diameter that is in a range from about 1 millimeter to about 4 millimeters. In one particular embodiment, the set of holes 342B have a diameter that is about 2 millimeters. In another particular embodiment, a ratio of the diameter of the set of holes 342A to the diameter of set of holes 342B is 5:2. These holes may also be smaller that these exemplary dimensions if the pet toy is marketed for smaller pets such as cats or small dogs.

This technique of dispensing a treat from a pet toy does not need to be used with the barbell shaped toys previously discussed. The plunger 250 can be utilized to dispense a treat from a pet toy, regardless of its exterior configuration. For example, the pet toy could have the exterior shape of an inanimate object, such as a fire hydrant, a dog bone, a ball, or any other shape that is appealing and/or stimulating to a dog. Alternatively, the pet toy could have an exterior shape that is symbolic of an organism from any taxonomic domain or kingdom. For example, the pet toy can generally resemble a fish, an animal, or a reptile. Each of these exemplary pet toys can have holes 34 formed through the sidewall of the body, particularly at the elongated central portion defining a central cavity similar to cavity 26, that is configured to eject or dispense a pet treat when pushed/expelled with plunger 250.

Unless explicitly stated that a particular shape or configuration of a component is mandatory, any of the elements, components, or structures discussed herein may take the form of any shape. Thus, although the figures depict the various elements, components, or structures of the present disclosure according to one or more exemplary embodiments, it is to be understood that any other geometric configuration of that element, component, or structure is entirely possible. For example, instead of the holes 242 or 342 being circular, the holes 242 or 342 can be semi-circular, triangular, rectangular or square, pentagonal, hexagonal, heptagonal, octagonal, decagonal, dodecagonal, diamond shaped or another parallelogram, trapezoidal, star-shaped, oval, ovoid, lines or lined, teardrop-shaped, cross-shaped, donut-shaped, heart-shaped, arrow-shaped, crescent-shaped, any letter shape (i.e., A-shaped, B-shaped, C-shaped, D-shaped, E-shaped, F-shaped, G-shaped, H-shaped, I-shaped, J-shaped, K-shaped, L-shaped, M-shaped, N-shaped, O-shaped, P-shaped, Q-shaped, R-shaped, S-shaped, T-shaped, U-shaped, V-shaped, W-shaped, X-shaped, Y-shaped, or Z-shaped), or any other type of regular or irregular, symmetrical or asymmetrical configuration.

In another example, instead of the one or more holes 242 or 342 being circular, there may be only a single hole in one of the interstitial spaces that is shaped as a thin slit defined by an elongated rectangle or similar shape.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

While components of the present disclosure are described herein in relation to each other, it is possible for one of the components disclosed herein to include inventive subject matter, if claimed alone or used alone. In keeping with the above example, if the disclosed embodiments teach the features of A and B, then there may be inventive subject matter in the combination of A and B, A alone, or B alone, unless otherwise stated herein.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under", or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present disclosure.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments. Furthermore, the use of any and all examples or exemplary language ("e.g.," "such as," or the like) is intended merely to better illustrate or illuminate the embodiments and does not pose a limitation on the scope of that or those embodiments. No language in this specification should be construed as indicating any unclaimed element as essential to the practice of the disclosed embodiment.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element or "another" element, that does not preclude there being more than one of the additional element or the another element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein. Further, recitation of ranges of values herein are not intended to be limiting, referring instead individually to any and all values falling within that range, unless otherwise indicated herein, and each separate value within such range is incorporated into the specification as if it were individually recited herein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

To the extent that the present disclosure has utilized the term "invention" in various titles or sections of this specification, or in the context of those sections, this term has been included as required by the formatting requirements of word document submissions (i.e., docx submissions) pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. A pet toy comprising:
   a body extending between a first end and a second end along a center longitudinal axis;
   a first enlarged member that defines the first end of the body;
   a second enlarged member that defines the second end of the body;
   an elongated central portion of the body that extends between the first enlarged member and the second enlarged member, wherein the elongated central portion defines a cavity therein;
   an inner surface of the elongated central portion, wherein the inner surface defines a majority of the cavity, wherein the cavity is partially defined by a tapered wall, and wherein the tapered wall tapers at an angle that complements an end of a plunger that is adapted to be inserted axially through the cavity;
   an opening defined in the body, wherein the opening is in open communication with the cavity, and the opening permits a treat stored in the cavity to exit the body;
   a first dimension of the first enlarged member, wherein the first dimension extends through the center longitudinal axis and is measured between two different points on a perimeter of the first enlarged member;
   a second dimension of the second enlarged member, wherein the second dimension extends through the center longitudinal axis and is measured between two different points on a perimeter of the second enlarged member;
   wherein the first dimension is greater than the second dimension that is adapted to cause the pet toy to roll along a curved trajectory as the pet toy rotates about the center longitudinal axis;
   wherein the elongated central portion has a diameter that is less than the second dimension such that the pet toy is generally barbell-shaped or dumbbell-shaped.

2. The pet toy of claim 1, wherein the first dimension is the diameter of the first enlarged member and the second dimension is the diameter of the second enlarged member, wherein the diameter of the first enlarged member is greater than the diameter of the second enlarged member.

3. The pet toy of claim 1, further comprising:
   a ratio of the first dimension to the second dimension, wherein the ratio is at least 1.05:1.

4. The pet toy of claim 1, further comprising:
   a ratio of the first dimension to the second dimension, wherein the ratio is in a range from about 1.05:1 to about 4:1.

5. The pet toy of claim 1, further comprising:
   a ratio of the first dimension to the second dimension, wherein the ratio is about 4:3.

6. The pet toy of claim 1, wherein the elongated central portion of the body is shaped as a conical cylinder that has a wider first end coupled to the first enlarged member and a narrower second end coupled to the second enlarged member.

7. The pet toy of claim 1, further comprising:
a plurality of ridge flights that extend outward from the elongated central portion that spirally wind around the longitudinal axis;
wherein the opening extends radially relative to the longitudinal axis through the elongated central portion of the body at a location that is between two ridge flights.

8. The pet toy of claim 1, wherein the opening is a hole extends radially relative to the longitudinal axis through the elongated central portion of the body, that further comprises:
a ratio of an inner diameter of cavity to a diameter of the hole that is in a range from about 3:1 to about 7:1.

9. The pet toy of claim 8, wherein the ratio is about 5:1.

10. The pet toy of claim 1, wherein the pet treat is a paste or paste-like material.

11. The pet toy of claim 1, wherein the pet treat is a non-Newtonian fluid.

12. The pet toy of claim 1, wherein the tapered wall terminates at an edge defining a circular end opening of the body, wherein the circular end opening has a diameter that is less than a diameter of the cavity.

13. The pet toy of claim 12, wherein the tapered wall is in the second enlarged member and the circular end opening extends axially through the second enlarged member and is in open communication with the cavity.

14. In combination, a pet toy, a pet treat, and a plunger, the combination comprising:
a pet toy body defining a cavity, and one or more openings in open communication with the cavity, and the one or more openings extend axially along a longitudinal axis through the pet toy body;
a plunger having a distal end, wherein the distal end of the plunger has an outer diameter that complements an inner diameter of the cavity;
wherein the pet toy body receives a pet treat within the cavity, wherein the pet treat is a paste or paste-like material;
wherein the distal end of the plunger moves axially along the longitudinal axis through the cavity to expel the pet treat outward from the cavity through the one or more openings to dispose the pet treat on an exterior surface of the pet toy body;
a first enlarged member that defines the first end of the pet toy body;
a first dimension of the first enlarged member, wherein the first dimension extends through the longitudinal axis and is measured between two different points on a perimeter of the first enlarged member;
a second enlarged member that defines the second end of the pet toy body;
a second dimension of the second enlarged member, wherein the second dimension extends through the longitudinal axis and is measured between two different points on a perimeter of the second enlarged member; and
wherein the first dimension is greater than the second dimension that is adapted to cause the pet toy to roll along a curved trajectory as the pet toy rotates about the longitudinal axis; and
wherein the one or more openings, through which the pet treat is expelled in response to axial movement of the plunger through the cavity, are defined in the second enlarged member that defines the second end of the pet toy body.

15. The combination of claim 14, further comprising:
an elongated central portion of the pet toy body that extends along the longitudinal axis between the first enlarged member and the second enlarged member, wherein the elongated central portion defines the cavity therein; and
an end opening defined in the first enlarged member at the first end of the pet toy body, wherein the end opening is in open communication with the cavity, and the end opening permits the treat to be inserted into the cavity, wherein the end opening receives the distal end of the plunger when the treat is to be expelled from the cavity through the one or more openings defined in the second enlarged member at the second end of the pet toy body.

16. The combination of claim 15, further comprising:
an inner surface of the elongated central portion, wherein the inner surface defines a majority of the cavity, wherein the cavity is partially defined by a wall on the second enlarged member, and wherein the wall on the second enlarged member is oriented at an angle relative to center longitudinal axis, wherein the orientation of the wall on the second enlarged member complements an end of the plunger that moves axially through the cavity.

17. A pet toy comprising:
a body extending between a first end and a second end along a center longitudinal axis;
a first enlarged member that defines the first end of the body;
a second enlarged member that defines the second end of the body;
an elongated central portion of the body that extends between the first enlarged member and the second enlarged member, wherein the elongated central portion defines a cavity therein;
an inner surface of the elongated central portion, wherein the inner surface defines a majority of the cavity, wherein the cavity is partially defined by a wall on the second enlarged member, and wherein the wall on the second enlarged member is oriented at an angle relative to center longitudinal axis, wherein the orientation of the wall on the second enlarged member complements an end of a plunger that is adapted to be inserted axially through the cavity;
an opening defined in the second enlarged member, wherein the opening is in open communication with the cavity, and the opening permits a treat stored in the cavity to exit the second end of the body in response to the plunger being moved axially through the cavity;
a first dimension of the first enlarged member, wherein the first dimension extends through the center longitudinal axis and is measured between two different points on a perimeter of the first enlarged member;
a second dimension of the second enlarged member, wherein the second dimension extends through the center longitudinal axis and is measured between two different points on a perimeter of the second enlarged member;
wherein the first dimension is greater than the second dimension that is adapted to cause the pet toy to roll along a curved trajectory as the pet toy rotates about the center longitudinal axis;
wherein the elongated central portion has an outer diameter that is less than the second dimension such that the pet toy is generally barbell-shaped or dumbbell-shaped.

* * * * *